United States Patent
Lee et al.

(10) Patent No.: US 9,571,187 B2
(45) Date of Patent: Feb. 14, 2017

(54) WAVELENGTH-DIVISION MULTIPLEXING OPTICAL COMMUNICATION SYSTEM AND METHOD FOR MEASURING OPTICAL PERFORMANCE OF AN OUTPUT SIGNAL FOR THE SYSTEM

(75) Inventors: Han-Hyub Lee, Daejeon (KR); Jie-Hyun Lee, Daejeon (KR); Eon-Sang Kim, Daejeon (KR); Sang-Soo Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 25 days.

(21) Appl. No.: 14/118,922

(22) PCT Filed: May 25, 2012

(86) PCT No.: PCT/KR2012/004182
§ 371 (c)(1),
(2), (4) Date: Nov. 20, 2013

(87) PCT Pub. No.: WO2012/161553
PCT Pub. Date: Nov. 29, 2012

(65) Prior Publication Data
US 2014/0079401 A1    Mar. 20, 2014

(30) Foreign Application Priority Data

May 25, 2011  (KR) .................. 10-2011-0049777
May 25, 2011  (KR) .................. 10-2011-0049778
(Continued)

(51) Int. Cl.
*H04B 10/079* (2013.01)
*H04J 14/02* (2006.01)
(Continued)

(52) U.S. Cl.
CPC ...... *H04B 10/0795* (2013.01); *H04B 10/2587* (2013.01); *H04J 14/02* (2013.01); *H04J 2014/0253* (2013.01)

(58) Field of Classification Search
CPC ..... H04J 14/02; H04B 10/2916; H04B 10/506
(Continued)

(56) References Cited

U.S. PATENT DOCUMENTS 6,304,350 B1 * 10/2001 Doerr et al. ................ 398/9
7,269,347 B1 *  9/2007 Matricardi ............ H04B 10/66
398/24

(Continued)

FOREIGN PATENT DOCUMENTS

KR  1020050104946 A  11/2005
KR  1020070025885 A   3/2007
(Continued)

OTHER PUBLICATIONS

"Multichannel seeded DWDM applications with single-channel optical interfaces," Series G: Transmission Systems and Media, Digital Systems and Networks, Feb. 2012, pp. 1-15, G.698.3, ITU-T, Geneva, Switzerland.

*Primary Examiner* — Oommen Jacob
(74) *Attorney, Agent, or Firm* — William Park & Associates Ltd.

(57) ABSTRACT

A wavelength-division multiplexing optical communication system and a method for measuring optical performance of an output signal for the system. The optical communication system includes: a service-provider device; a local node; and a plurality of subscriber devices. The service-provider device includes: a plurality of first optical transceivers; a first optical multiplexer/demultiplexer (OD/OM) connected to the plurality of first optical transceivers; and a seed-light source providing seed light. Each subscriber device includes a second optical transceiver. The local node connects the (Continued)

service-provider device and the plurality of subscriber devices to each other using a DWDM link comprising: a second multiplexer/demultiplexer (OD/OM); and a single-mode optical fiber for transmission. Here, the optical intensity of an output signal of the second optical transceiver is determined by compensating for the value of the loss caused when the output signal passes through the second OD/OM of the local node.

22 Claims, 41 Drawing Sheets

(30) Foreign Application Priority Data

| | | |
|---|---|---|
| May 25, 2011 | (KR) | 10-2011-0049779 |
| May 25, 2011 | (KR) | 10-2011-0049780 |
| Nov. 10, 2011 | (KR) | 10-2011-0117184 |

(51) Int. Cl.
  *H04B 10/20* (2006.01)
  *H04B 10/2587* (2013.01)

(58) Field of Classification Search
  USPC .............................................. 398/81, 79, 43
  See application file for complete search history.

(56) References Cited

U.S. PATENT DOCUMENTS

| | | | |
|---|---|---|---|
| 7,409,164 | B2 | 8/2008 | Seo |
| 8,135,278 | B2 | 3/2012 | Lee et al. |
| 8,180,221 | B2 | 5/2012 | Lee et al. |
| 8,644,711 | B2 | 2/2014 | Kim et al. |
| 2005/0111852 | A1* | 5/2005 | Mahgerefteh ........... G02B 5/281 398/187 |
| 2007/0140693 | A1* | 6/2007 | Li et al. ........................... 398/67 |
| 2010/0150188 | A1 | 6/2010 | Lee |
| 2010/0158522 | A1 | 6/2010 | Cho et al. |
| 2010/0221008 | A1* | 9/2010 | Lee ....................... H04B 10/506 398/72 |
| 2011/0091214 | A1 | 4/2011 | Cheng |
| 2011/0222855 | A1 | 9/2011 | Kim et al. |
| 2012/0213519 | A1* | 8/2012 | Lee et al. ......................... 398/72 |
| 2014/0079401 | A1* | 3/2014 | Lee et al. ......................... 398/81 |

FOREIGN PATENT DOCUMENTS

| | | | |
|---|---|---|---|
| KR | 1020090004121 A | | 1/2009 |
| KR | 1020090066153 A | | 6/2009 |
| KR | 1020090089563 A | | 8/2009 |
| KR | 1020100070692 A | | 6/2010 |
| WO | WO/2010/093195 | * | 8/2010 |

* cited by examiner

SPECTRA BEFORE LOCKING
1530nm — 1560nm

SPECTRA AFTER LOCKING
1530nm — 1560nm

WAVELENGTH-DIVISION MULTIPLEXING OPTICAL COMMUNICATION SYSTEM AND METHOD FOR MEASURING OPTICAL PERFORMANCE OF AN OUTPUT SIGNAL FOR THE SYSTEM

TECHNICAL FIELD

The present invention relates to a wavelength division multiplexing passive optical network (WDM-PON), and more particularly, to a WDM-PON having a seed light injection-type and a method of measuring optical performance of an output signal in the WDM-PON.

BACKGROUND ART

In a wavelength division multiplexing (WDM) passive optical network (PON), total network transmission capacity can be easily enhanced using a plurality of channels in which optical signals have different wavelengths. The wavelengths of signals that are transmitted and received in most current WDM-PON systems are fixed, and thus optical transceivers having different wavelengths are basically required to increase the number of channels. That is, 40 optical transceivers having different output wavelengths are required to transmit signals of 40 channels. In this case, since 40 optical transceivers having different wavelengths must always be provided in preparation for malfunctions of the optical transceivers, operation comes with financial burden.

To solve this problem, seed light injection-type WDM-PONs using a wavelength-independent optical transceiver that operates regardless of wavelength have been developed. The wavelength-independent optical transceiver has an advantage in that wavelength can be readily determined according to the wavelength of seed light since the optical transceiver can produce an output optical signal having the same wavelength as the injected seed light. Therefore, the wavelength-independent optical transceiver can be easily replaced when it malfunctions, and it is more economical since it is not necessary to have a spare optical transceiver on hand for every channel.

Wavelength-independent WDM-PON (i.e., colorless WDM-PON) technology satisfying these requirements has been widely studied all over the world. Also, among various techniques undergoing research, one technique that has been developed to the point of being put into use currently is wavelength locking type WDM technology that determines output wavelengths of a wavelength-independent light source using an incoherent broadband light source as a seed light source.

DISCLOSURE

Technical Problem

The present invention is designed to solve the problems of the conventional art, and it is an object of the present invention to enable stable communication within a seed light-injected WDM-PON using an incoherent broadband light source or a coherent light source as a seed light source.

It is another object of the present invention to provide a method of measuring characteristics of a signal in a WDM-PON using an incoherent broadband light source as a seed light source.

It is still another object of the present invention to provide a method for measuring characteristics of an output signal of a subscriber unit in a WDM-PON that can minimize deterioration of transmission qualities of the output signal.

Technical Solution

In order to accomplish the above objects, one exemplary embodiment of the present invention provides a WDM-PON system including a service provider unit, a remote node, and a plurality of subscriber units. The service provider unit includes a plurality of first optical transceivers, a first optical multiplexer/demultiplexer (OD/OM) connected to the plurality of first optical transceivers to multiplex/demultiplex light transmitted/received to/from the plurality of first optical transceivers, and a seed light source configured to provide seed light, each of the plurality of subscriber units includes a second optical transceiver, and the remote node connects the service provider unit and the plurality of subscriber units to each other through a second OD/OM and a dense wavelength division multiplexing (DWDM) link including a single-mode transmitting optical fiber. Also, a light intensity of an output signal from the second optical transceiver is determined by compensating for a loss value caused when the output signal passes through the second OD/OM of the remote node.

According to one aspect of the exemplary embodiment, the light intensity of the output signal may be determined at the location in light intensity between the service provider unit and the remote node. Also, the compensated loss value may be a minimum value of insertion loss of the DWDM link.

According to another aspect of the exemplary embodiment, a wavelength band of the optical signal propagating from the service provider unit to the subscriber units may be different from a wavelength band of the optical signal propagating from the subscriber units to the service provider unit. In this case, the second OD/OM may be a cyclic OD/OM having free spectral range (FSR) characteristics.

According to still another aspect of the exemplary embodiment, the single-mode transmitting optical fiber may include a first single-mode bidirectional fiber configured to connect the service provider unit and the second OD/OM. Also, the single-mode transmitting optical fiber may include a plurality of second single-mode bidirectional fibers configured to connect the second OD/OM and each of the plurality of subscriber units.

According to still another aspect of the exemplary embodiment, a broadband light source (BLS) may be used as the seed light source. In addition, a coherent light source (i.e., a multi-wavelength laser seed source) in which output light spectra have very narrow bandwidths may be used as the seed light source.

According to still another aspect of the exemplary embodiment, an optical transmitter of the second optical transceiver may transmit an optical signal that satisfies an optical eye mask in which a crossing level between a level "1" signal and a level "0" signal is set at a level which is lower than 50% of an intensity of the level "1" signal. In this case, the crossing level may have an intensity corresponding to 45% of the intensity of the level "1" signal.

According to yet another aspect of the exemplary embodiment, an optical receiver of the first optical transceiver includes a threshold varying unit configured to be able to vary a decision threshold value to 0.45 to 0.35 on the assumption that an intensity of level "1" of a modulated optical signal is set to 1. Also, a reference transmission rate may be 2.45776 Gb/s or 2.5 Gb/s. In addition, information transmitted through the WDM-PON system may include a forward error correction (FEC) code.

In order to accomplish the above objects, another exemplary embodiment of the present invention provides a WDM-PON system including a service provider unit, a remote node, and a plurality of subscriber units. The service provider unit includes a plurality of first optical transceivers, a first OD/OM connected with the plurality of first optical transceivers to multiplex/demultiplex light transmitted/received to/from the plurality of first optical transceivers, and a seed light source configured to provide seed light, each of the plurality of subscriber units includes a second optical transceiver, and the remote node connects the service provider unit and the plurality of subscriber units to each other through a second OD/OM and a DWDM link including a single-mode transmitting optical fiber. Also, an optical transmitter of the second optical transceiver transmits an optical signal that satisfies an optical eye mask in which a crossing level between a level "1" signal and a level "0" signal is set at a level which is lower than 50% of an intensity of the level "1" signal.

In order to accomplish the above objects, still another exemplary embodiment of the present invention provides a method of measuring light intensity of an output signal in the WDM-PON system including a service provider unit, a remote node and a plurality of subscriber units. The method includes compensating for a loss value caused when an output signal of an optical transceiver provided in each the plurality of subscriber units passes through an OD/OM provided in the remote node and measuring light intensity of the output signal of the optical transceiver.

Advantageous Effects

According to the present invention, optical signal transmission qualities required for WDM-PON in which an incoherent BLS is used as a seed light source may be obtained by adjusting wide bandwidths of an OD/OM of a DWDM link to minimize deterioration in light transmission performance due to crosstalk between optical channels and deterioration in light transmission performance due to a reduction in bandwidth according to light isolation.

Also, a method of measuring light intensity of the TEE output signal by compensating for optical loss in the OD/OM in the DWDM link is provided. Here, a receiver including a suitable optical eye mask and also a decision threshold varying apparatus is provided to enhance the transmission/reception performance of an optical signal.

In addition, according to the present invention, measurement bandwidths may be variably adjusted according to bandwidth of the optical signal, and an effect of adjacent channels may be minimized, thereby improving the accuracy of transmission qualities of the measured signal.

Furthermore, according to the present invention, the light intensity of injected seed light or possibility of stable communication can be easily determined regardless of the operating conditions of a user's device, by separating only an optical signal of a channel for which the possibility of stable communication is to be determined using an optical filter and measuring an optical output intensity.

BEST MODE

The advantages and characteristics of the present invention and methods of achieving the advantages and characteristics will become apparent with reference to exemplary embodiments as will be described later together with accompanying drawings. However, the present invention is not intended to limit the following exemplary embodiments, but may be realized in a variety of different forms. Also, the exemplary embodiments disclosed below are simply described to complete the disclosure of the present invention and provide the scope of the present invention to those skilled in the art to which the present invention belongs. Accordingly, the present invention is defined only by the scope of the claims. Meanwhile, the terminology used herein is for the purpose of describing particular exemplary embodiments only and is not intended to limit the exemplary embodiments. The singular forms "a," "an" and "the" are intended to include the plural forms as well, unless the context clearly indicates otherwise. Also, it should be understood that the terms "comprises," "comprising," "includes" and/or "including," when used herein, specify the presence of stated features, integers, steps, operations, elements, components and/or groups thereof, but do not preclude the presence or addition of one or more other features, integers, steps, operations, elements, components and/or groups thereof.

First, a seed light injection-type WDM-PON according to one exemplary embodiment of the present invention will be described. In the seed light injection-type WDM-PON, seed light produced from a seed light source disposed at a service provider unit (i.e., head end equipment (HEE)) is wavelength-divided while passing through a wavelength division multiplexer disposed on an optical line. Thereafter, the wavelength division-multiplexed seed light is configured to be injected into a wavelength-independent light source which is used in a subscriber unit (i.e., tail end equipment (TEE)) disposed at a remote location. An optical amplifier-based BLS is generally used as the seed light source disposed at the HEE, but the present invention is not limited thereto as will be described later.

In this case, an inexpensive Fabry Perot laser diode (FP-LD) or a reflective semiconductor optical amplifier (RSOA) may be used as the wavelength-independent light source. The FP-LD and RSOA output amplified spontaneous emission within a wide band of more than several tens of nanometers, depending on the characteristics of constituents of a semiconductor.

Figure 1:
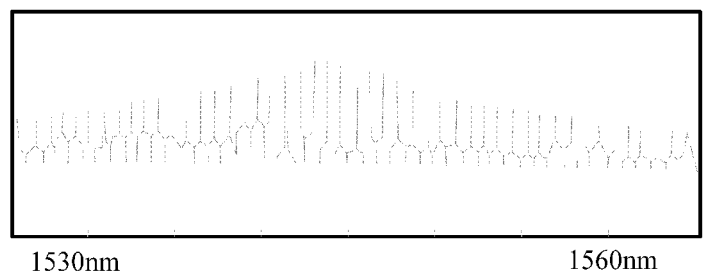
FIG. 1 is a diagram explaining a mode locking effect of a Fabry Perot laser diode (FP-LD).
Figure 1:
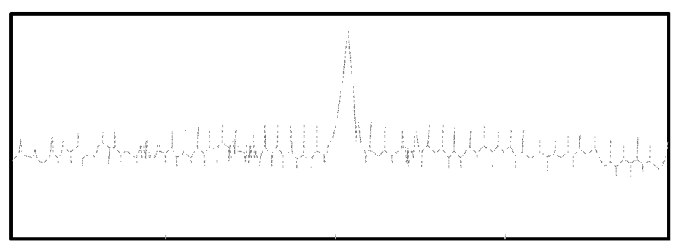

The FP-LD shows output characteristics in which a plurality of lasers oscillate as shown in FIG. 1 since a plurality of different laser resonance modes are configured in the structure of the FP-LD. This is referred to as a multi-mode laser. In this case, when seed light is injected from the outside, an output mode of the FP-LD having the same wavelength band as the wavelengths of the injected seed light is selected. As a result, light having characteristics similar to output characteristics of a DFB laser diode is output, as shown in the lower panel of FIG. 1. This is referred to as a mode locking effect.

However, the FP-LD has a problem in that, when a mode is selected, the mode locking effect may differ according to the difference in center wavelengths between seed light and each mode of the FP-LD. Also, when the FP-LD is directly modulated, the difference in modulation rate may be caused according to the reflexibility of a resonator constituting the FP-LD.

Another method used to overcome this obstacle includes a method of injecting seed light into an RSOA. Unlike the FP-LD, the RSOA has no laser oscillation mode formed therein since one surface of a resonator is given a high-reflection coating and the other surface is given a low-reflection coating. Therefore, the center wavelengths of the seed light do not necessarily match the center wavelengths of the oscillation mode, and direct modulation at 2.5 Gb/s or more is possible.

The difference in light intensity of output signals is caused due to the structural characteristics of a RSOA-based optical transmitter or an F-P LD-based optical transmitter, depending on a polarization state of input seed light. This is referred to as polarization-dependent gain. To minimize the difference, a polarization state of the input seed light is preferably maintained at 100%. An EDFA-based BLS has a degree of polarization of 90% or more, but a seed light source using a laser diode has a very low degree of polarization. Therefore, the difference in light intensity of the output signals in the TEE optical transmitter may be caused according to the polarization state of the seed light. To solve this problem, it is preferable to use the RSOA-based optical transmitter having a low polarization-dependent gain.

Figure 2:
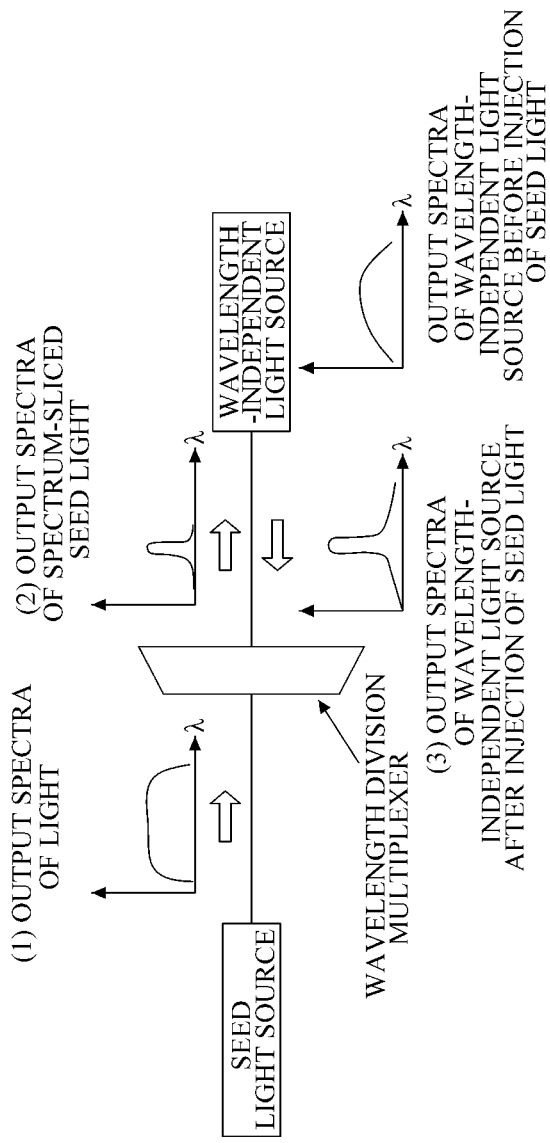
FIG. 2 shows a method of operating a seed light injection-type WDM-PON.

FIG. 2 schematically shows a method of operating a seed light injection-type WDM-PON.

In the seed light injection-type WDM-PON shown in FIG. 2, an optical signal is produced through the following operations.

First operation: optical passband seed light is produced from a seed light source disposed at the left portion of FIG. 2.

Second operation: the optical passband seed light is spectrum-sliced through a wavelength division multiplexer.

Third operation: the spectrum-sliced seed light is injected into a wavelength-independent light source.

Fourth operation: the input seed light is amplified and modulated at the wavelength-independent light source and output from the wavelength-independent light source.

Unlike the WDM-PON using an optical transceiver having a wavelength-dependent laser diode (LD) formed therein, the seed light injection-type WDM-PON as described above uses an optical transceiver having a wavelength-independent light source formed at a subscriber unit (TEE) side thereof. Therefore, the seed light injection-type WDM-PON has an advantage in that the same optical transceivers may be used in a plurality of TEE. As a result, it is very easy to install the optical transceivers and replace the optical transceivers when the optical transceivers malfunction, and it is more economical since it is not necessary to prepare for a spare optical transceiver for every optical transceiver currently in operation.

Figure 3:
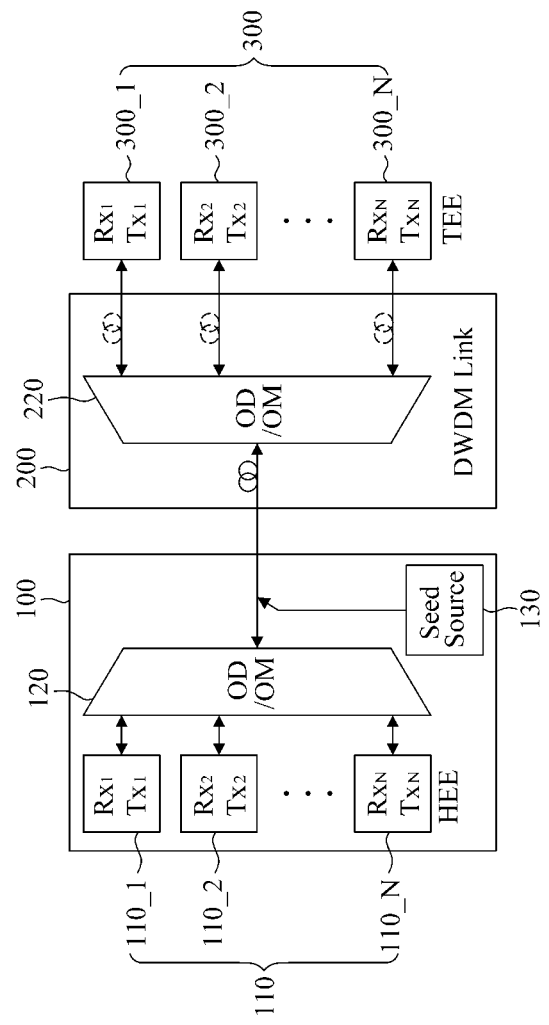
FIG. 3 is a block diagram showing a structure of the seed light injection-type WDM-PON according to one exemplary embodiment of the present invention.

FIG. 3 is a block diagram showing the configuration of a seed light injection-type WDM-PON according to one exemplary embodiment of the present invention. Referring to FIG. 3, the WDM-PON includes HEE 100 which is a service provider unit such as a mobile base station, and a plurality of TEE (300: 300_1, 300_2, . . . , 300_N) which are subscriber units. Here, a dense wavelength division multiplexing (DWDM) link 200 is installed between the HEE 100 and the TEE 300.

The HEE 100 is provided with a plurality of transceivers (Tx and Rx) (110: 110_1, 110_2, . . . , 110_N) and a first OD/OM 120, and is also provided with a seed light source 130 configured to provide seed light. Also, the DWDM link 200 includes a transmitting optical fiber configured to transmit an optical signal and a second OD/OM 220 configured to wavelength-divide the seed light transmitted from the seed light source 130 and inject the wavelength-divided seed light into a plurality of TEE 300. As shown in FIG. 3, the transmitting optical fiber includes a first single-mode bidirectional fiber configured to connect the HEE 100 and the second OD/OM 220. Also, the transmitting optical fiber includes a plurality of second single-mode bidirectional fibers configured to connect the second OD/OM 220 and each of the plurality of TEE 300.

The seed light injection-type used in the WDM-PON according to one exemplary embodiment of the present invention uses a condition in which, when seed light is injected into a wavelength-independent light source such as FP-LD, RSOA or a reflective amplifier modulator (RAM) from the outside of an optical transmitter constituting a transmitter as described above, the FP-LD, RSOA or RAM amplifies and modulates only the injected seed light, and the other spontaneously emitted light is saturated.

In this case, an incoherent BLS, a spectrum-sliced incoherent light source (i.e., a pre-spectrum sliced BLS) or a coherent light source (i.e., a multi-wavelength source, MWS) configured to produce a discrete line in every channel may be used as the seed light source 130. The spectrum-sliced incoherent light source includes an optical filter having periodic transmission characteristics formed in the incoherent BLS so as to improve the efficiency of the incoherent BLS. As a result, the spectrum-sliced incoherent light source has a structure in which seed light is primarily spectrum-sliced, and the spectrum-sliced seed light is then re-amplified. When the seed light is produced in this way, the spectrum-sliced incoherent light source has an advantage in that loss of the seed light may be minimized when the seed light passes through the OD/OM. Also, the seed light source 130 may be composed of a plurality of coherent light sources (multi-wavelength laser seed sources). For example, examples of the seed light source 130 include a spectrum-sliced incoherent BLS, a coherent light source having very narrow optical output spectra, etc.

Figure 4:
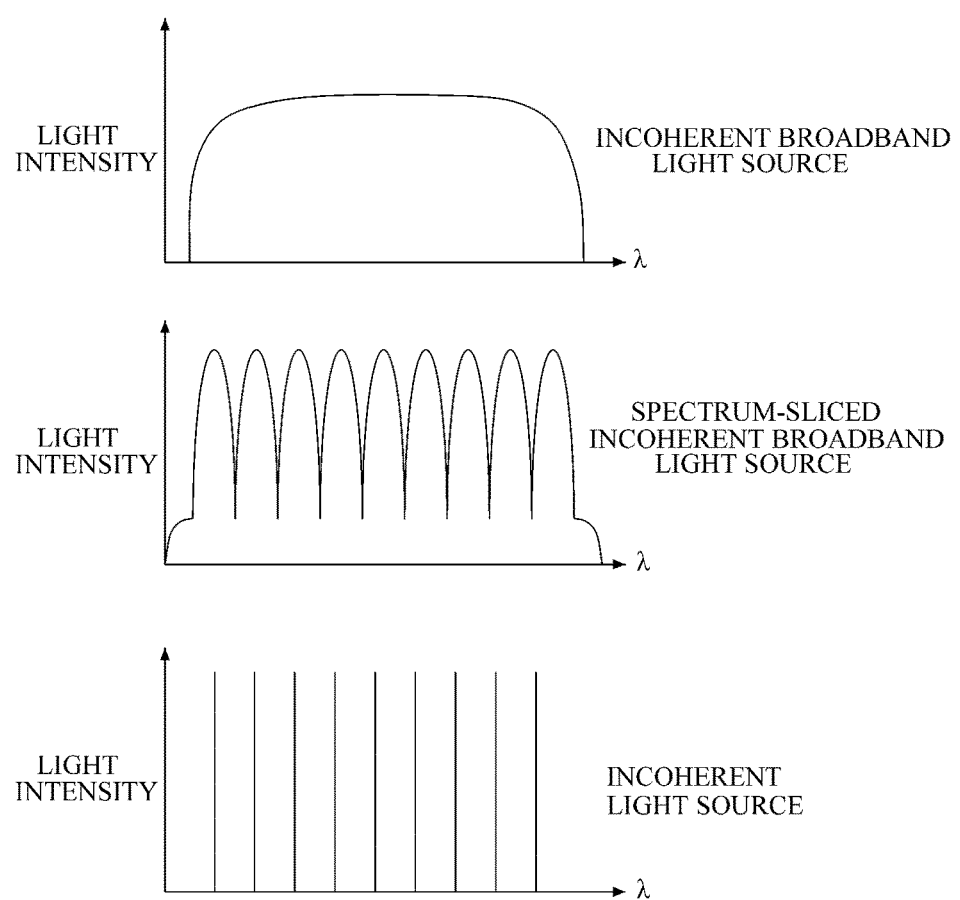
FIG. 4 shows one examples of the expected output spectra according to the kind of seed light sources.

FIG. 4 is a diagram showing one example of the expected output spectra according to the kind of the seed light source 130. The graph of FIG. 4 shows the light intensities of an incoherent BLS, a spectrum-sliced incoherent BLS and a coherent light source, sequentially from the top. In particular, referring to the output spectra of the coherent light source shown in the bottom of FIG. 4, a discrete line seems to be produced in every channel since the spectra have a very narrow bandwidth.

The seed light source 130 configured thus provides a seed light to the TEE 300. Light transmitted from the seed light source 130 is wavelength-divided while passing through a transmitting optical fiber and then the second OD/OM 220, and the wavelength-divided seed light is injected into each of the TEE 300. In this case, an optical coupler (not shown) may be further provided to input the light emitted from the seed light source 130 into the second OD/OM 220 in the DWDM link 200. Light divided based on the spectra is injected into each of the TEE 300 by means of the second OD/OM 220, and the wavelength-independent light source such as FP-LD, RSOA or RAM of the TEE 300 is wavelength-fixed by the injected light. As a result, light having the same wavelengths as the injected light is output. In this case, the characteristics of the output light from the TEE 300 are determined according to the characteristics of the seed light and operating conditions of the TEE 300. In particular, the wide bandwidths of the output light from the TEE 300 depend on the wide bandwidths of the seed light. Also, the wide bandwidths of the seed light are determined according to the light transmission characteristics of the second OD/OM 220.

Figure 5:
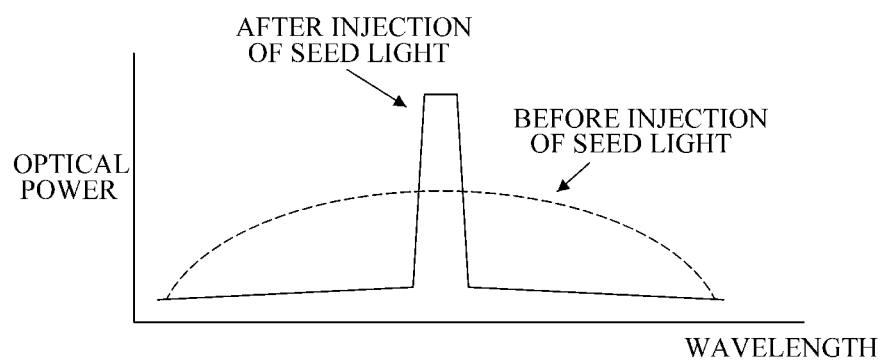
FIG. 5 is a diagram showing a procedure of determining output wavelengths of seed light after being injected into the TEE.

FIG. 5 is a diagram showing a procedure of determining output wavelengths of seed light after being injected into the TEE 300. A dotted line in FIG. 5 represents a type of an output signal of the TEE 300 before seed light is input into the TEE 300. This is identical to amplified spontaneous emission (ASE) output from the wavelength-independent light source constituting the TEE 300. Also, a solid line in FIG. 5 represents a type of an output signal of the TEE 300 after seed light is input into the TEE 300. From these facts, it can be seen that a signal having certain wavelengths is output according to the wavelengths of the seed light.

Comparing two cases using the RSOA and the FP-LD as the wavelength-independent light source, the output spectra of the amplified spontaneous emission change according to the reflexibility of output terminals of the RSOA and the FP-LD, but show similar characteristics after the seed light is input and its wavelengths are fixed. In particular, when the reflexibility of the output terminal is reduced to $10^{-3}$ or less so as to enhance a transmission rate of the FP-LD, the FP-LD shows optical output spectra very similar to the RSOA.

Meanwhile, when BLS is used as the seed light, the seed light output from the HEE 100 is wavelength-divided while passing through the second OD/OM 220, and input into the TEE 300. In this procedure, the correlation formed between the same frequencies in the seed light is broken. As a result, relative intensity noise (RIN) characteristics of the seed light are deteriorated.

The RIN characteristics of the optical signal are important since the RIN characteristics are directly related to the transmission quality of the optical signal. The RIN characteristics of the optical signal are inversely proportional to bandwidths of a signal. That is, as the bandwidths of the optical signal increase, a degree of mutual beating between incoherent signals is decreased, thereby improving the RIN characteristics of the optical signal. An arrayed waveguide grating (AWG) using a multiple waveguide array method or a thin film filter (TFF) having multiple thin film coating layer is used as the OD/OM. In the case of the DWDM-PON having a large number of channels, the AWG is generally used as the OD/OM. The AWGs may be divided into a Gaussian passband AWG, a Flattop passband AWG and a wide Gaussian passband AWG having the mean characteristics between the Gaussian passband AWG and the Flattop passband AWG, depending on the transmission bandwidths of the AWGs.

Figure 6:
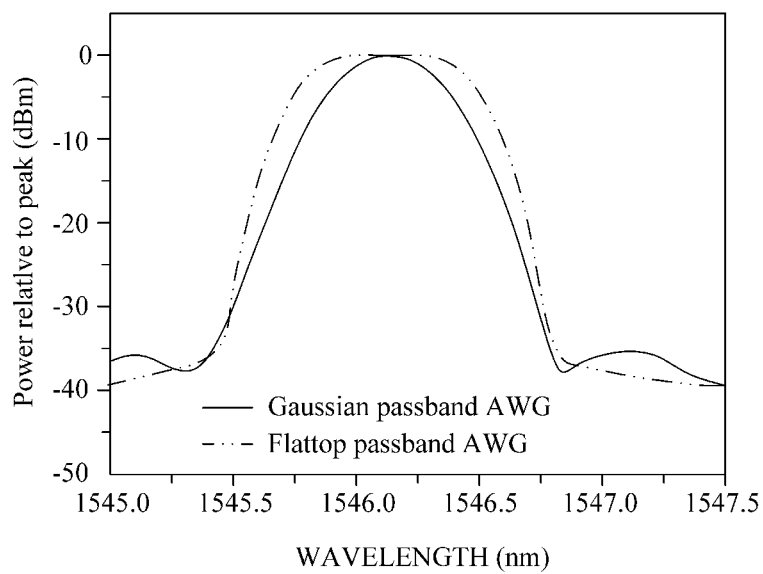
FIG. 6 is a graph illustrating a transmission pattern according to wavelengths of various arrayed waveguide gratings (AWGs).

FIG. 6 is a graph illustrating a transmission pattern according to the wavelengths of the Gaussian passband AWG and the Flattop passband AWG. Referring to FIG. 6, it can be seen that the Flattop passband AWG has wider transmission bandwidths than the Gaussian passband AWG according to the wavelengths. Therefore, when the BLS is used as the seed light, the RIN characteristics of the seed light spectrum-sliced using the Flattop passband AWG are more improved compared to those of the seed light spectrum-sliced using the Gaussian passband AWG.

Figure 7:
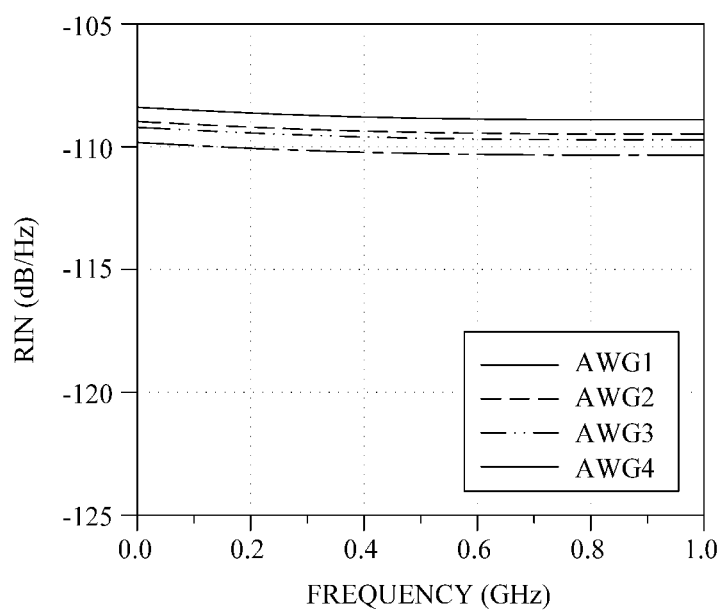
FIG. 7 shows the relative intensity noise (RIN) characteristics of a seed light according to the characteristics of various AWGs.

FIG. 7 shows the RIN characteristics of a seed light according to the Gaussian passband AWG and the Flattop passband AWG. Referring to FIG. 7, when the Flattop passband AWG is used, it can be seen that the RIN characteristics are further improved.

Meanwhile, according to theoretical calculation, an RIN value of an optical signal, which is input into Rx in the HEE required to transmit the optical signal without an error should be equal to or less than −110 dB/Hz in the case of the seed light injection-type WDM-PON having a transmission rate of 1.25 Gb/s. According to the experimental results conducted by the present inventors, however, the optical signal may be transmitted without an error even when the RIN value is −109 dB/Hz.

The wide bandwidths of the OD/OM satisfying the above-described requirements are proposed in one exemplary embodiment of the present invention.

According to one exemplary embodiment of the present invention, the RSOA may be, for example, used as the wavelength-independent optical transceiver (TEE) in which seed light is input to determine the wavelengths of the seed light. The RSOA functions as a modulator configured to amplify the input seed light and simultaneously modulate the amplified seed light. However, the RSOA essentially has a nonlinear index since a gain medium is formed of a semiconductor material. As a result, an optical signal output from the RSOA also shows nonlinear characteristics.

The representative nonlinear characteristics of the RSOA include characteristics in which an output signal has wider bandwidths than a seed light, and characteristics in which the wavelengths of the output signal shifts toward a long wavelength. The characteristics are strongly achieved as the intensity of the seed light input into the RSOA and an operating current of the RSOA increase.

Figure 8:
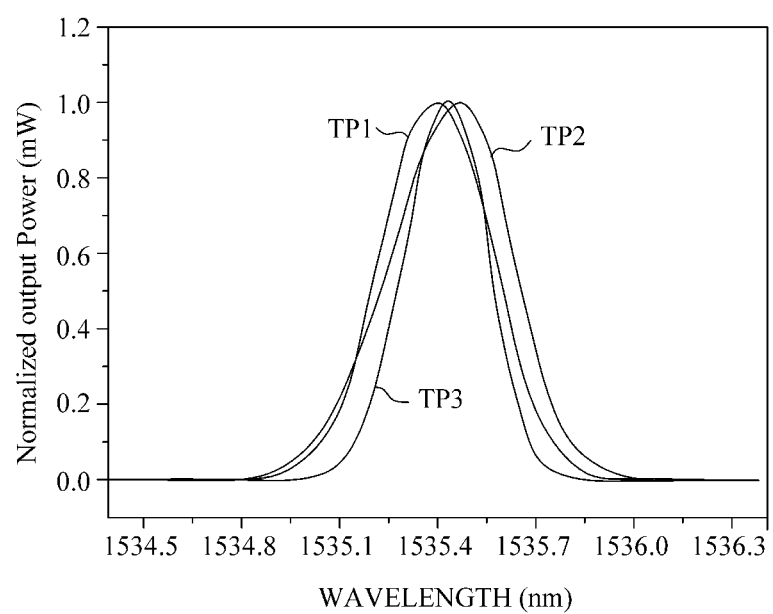
FIG. 8 is a diagram showing the spectra of input/output signals of TEE measured in one exemplary embodiment in which a Gaussian passband AWG is used as an OD/OM and a reflective semiconductor optical amplifier (RSOA) is used as the TEE.

FIG. 8 shows the spectra of seed light and a TEE output signal measured in one example in which the Gaussian passband AWG is used as the OD/OM and the RSOA is used as the TEE. In FIG. 8, TP1 represents the optical spectra of the seed light, TP2 represents the optical spectra of the TEE output signal, and TP3 represents the optical spectra of the TEE signal after passing through the second OD/OM in the DWDM link.

Referring to FIG. 8, it can be seen that the TEE output signal has wider optical spectra than the seed light. The optical signal output from the TEE passes through the OD/OM in the DWDM link and is transmitted into a receiving stage of the HEE. Therefore, the loss of data frequency components required for a transmission signal as well as the loss of optical power should be compromised due to the difference between the transmission bandwidths of the second OD/OM and the bandwidths of the TEE output signal. As a result, the transmission qualities of a signal are reduced.

Therefore, in the seed light injection-type WDM-PON using the incoherent BLS as the seed light source, an RIN value of seed light injected into the TEE is not only determined but also the transmission qualities of the signal output from the TEE are determined according to the wide bandwidths of the OD/OM. As a result, it is very important to select the wide bandwidths of the OD/OM, and thus the wide bandwidths of the OD/OM should be determined in consideration of the transmission qualities of the seed light injection-type WDM-PON to be achieved.

Figure 9:
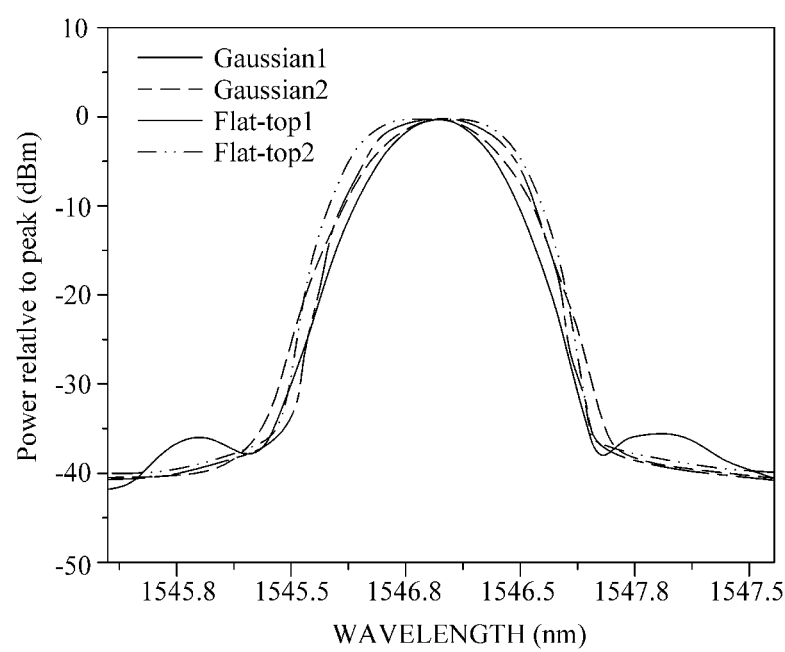
FIG. 9 is a diagram showing the output spectra of a seed light according to the kind of second OD/OMs in a DWDM link.

FIG. 9 is a diagram showing the output spectra of seed light according to the kind of the second OD/OM in the DWDM link. Output signals used in Gaussian passband AWGs 1 and 2 and Flattop passband AWGs 1 and 2 are shown in FIG. 9. Here, the Gaussian passband AWGs 1 and 2 and the Flattop passband AWGs 1 and 2 have different bandwidths.

As shown in FIG. 9, the spectra of the output seed light are widely measured according to the wide bandwidths of the OD/OM.

The following Table 1 lists the bandwidth of the seed light according to the kind of the second OD/OM in the DWDM link.

TABLE 1

| Units | 1 dB BW | | 2 dB BW | | 3 dB BW | | 10 dB BW | | 15 dB BW | |
|---|---|---|---|---|---|---|---|---|---|---|
| | pm | GHz | pm | GHz | Pm | GHz | pm | GHz | pm | GHz |
| Gaussian 1 | 231 | 28.875 | 326 | 40.75 | 398 | 49.75 | 717 | 89.625 | 872 | 109 |
| Gaussian 2 | 264 | 33 | 374 | 46.75 | 458 | 57.25 | 831 | 103.875 | 1001 | 125.125 |
| Flat-top 1 | 405 | 50.625 | 493 | 61.625 | 559 | 69.875 | 837 | 104.625 | 966 | 120.75 |
| Flat-top 2 | 503 | 62.875 | 598 | 74.75 | 663 | 82.875 | 931 | 116.375 | 1050 | 131.25 |

Figure 10:
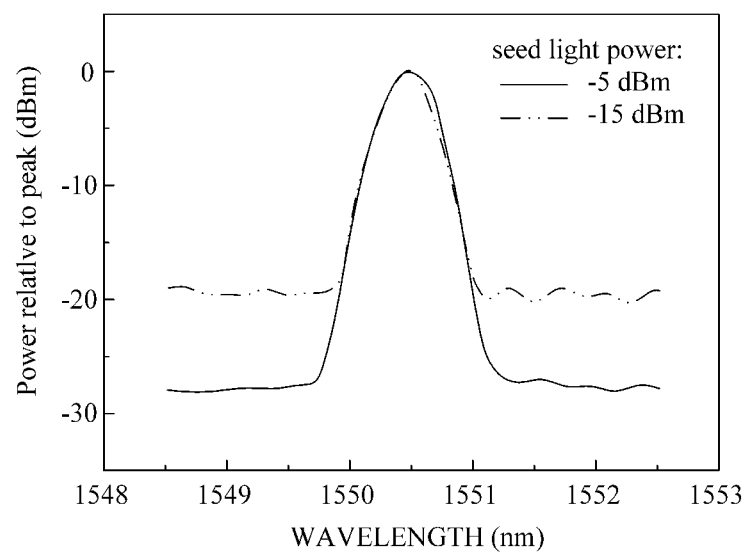
FIG. 10 is a diagram showing the output spectra of TEE according to the kind of second OD/OMs in the DWDM link.

FIG. 10 shows the output spectra of the TEE. When the RSOA is used as the TEE Tx, the spectra of injected seed light become wider than the spectra of an output signal due to the nonlinearity of the RSOA. However, it is shown that, when an input value is −15 dBm, the widening effect is not significant. An increase in intensity of the seed light causes an increase in an optical carrier in the TEE Tx, thereby enhancing the modulation characteristics of the optical signal. However, the seed light input into the TEE Tx may have an intensity of at least −18 dBm in consideration of economic efficiency, output light intensity of the seed light in the technically realizable HEE, the loss and loss margin of the DWDM link, and transmission performance.

The bandwidth of the seed light and also the wide bandwidths of the TEE output signal passing through the second OD/OM change according to a change in standard of the second OD/OM in the DWDM link. The following Table 2 lists the bandwidths of the TEE output signals measured according to the kind and shape of the OD/OM in the DWDM link. From the measured results, it can be seen that the bandwidths of the TEE output signals are determined in proportion to the optical pass band of the seed light input as shown in FIG. 9.

TABLE 2

| Units | 1 dB BW pm | 1 dB BW GHz | 2 dB BW pm | 2 dB BW GHz | 3 dB BW pm | 3 dB BW GHz | 10 dB BW pm | 10 dB BW GHz | 15 dB BW pm | 15 dB BW GHz |
|---|---|---|---|---|---|---|---|---|---|---|
| Gaussian1 | 253 | 31.625 | 356 | 44.5 | 425 | 53.125 | 735 | 91.875 | 933 | 116.625 |
| Gaussian 2 | 217 | 27.125 | 325 | 40.625 | 417 | 52.125 | 847 | 105.875 | 1041 | 130.125 |
| Flat-top 1 | 454 | 56.75 | 522 | 65.25 | 578 | 72.25 | 865 | 108.125 | 1049 | 131.125 |
| Flat-top 2 | 481 | 60.125 | 584 | 73 | 650 | 81.25 | 955 | 119.375 | 1151 | 143.875 |

Figure 11:
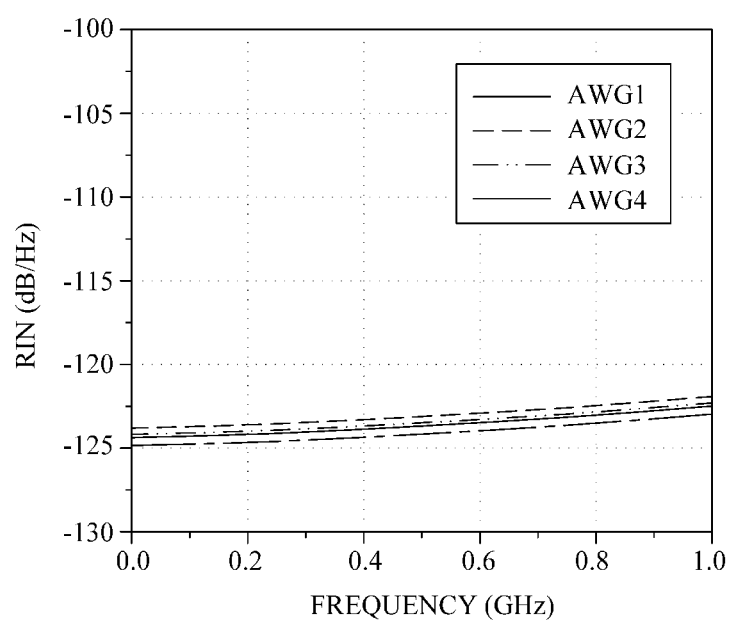
FIG. 11 shows the RIN values of the seed light and TEE output signals according to the kind of second OD/OMs in a DWDM link.

The change in standard of the OD/OM in the DWDM link causes a change in RIN characteristics of the TEE output signal. FIG. 11 shows the RIN values of the TEE output signals measured according to the kind of OD/OMs.

In the case of the TEE output signal, the RIN value of the TEE signal is lower than that of the seed light due to an intensity noise suppression effect of the RSOA used as a signal light source. Therefore, when the spectrum-sliced seed light is modulated using an external modulator, a high RIN value of the seed light is not suitable for signal transmission at a rate of 1.25 Gb/s. However, when the RSOA or FP-LD is used as the TEE, it is possible to transmit a signal at a rate of 1.25 Gb/s or more due to an increase in RIN value.

As the TEE output signal passes through the second OD/OM and the optical fiber in the DWDM link and is then transmitted toward the HEE, the RIN characteristics are deteriorated due to a filtering effect of the second OD/OM and a chromatic dispersion effect of the optical fiber. That is, a degree of correlation of the TEE output optical signals is lowered due to these effects, and thus RIN at the same frequencies increases.

Figure 12:
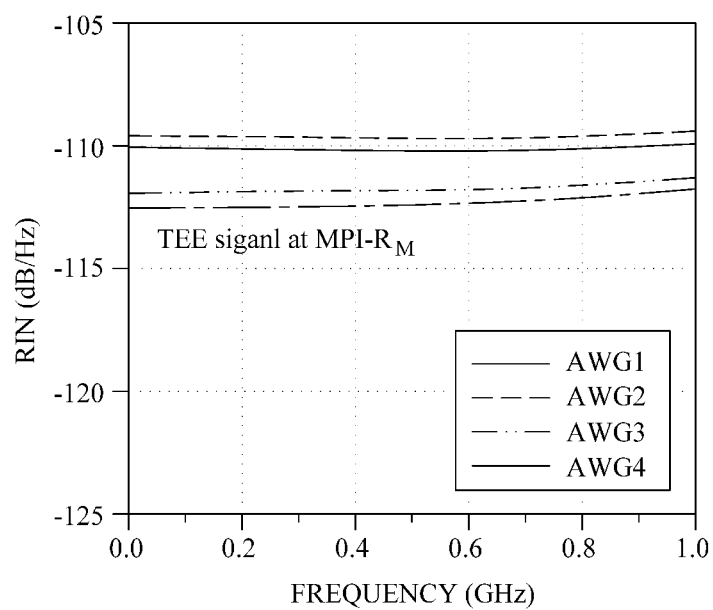
FIG. 12 is a diagram showing the RIN values of optical signals after the optical signals pass through the DWDM link.
Figure 13:
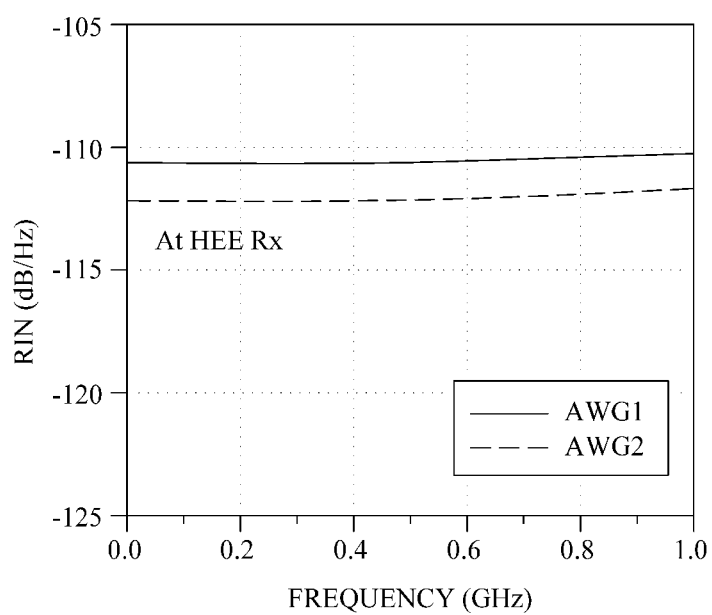
FIG. 13 is a diagram showing the RIN values of optical signals after the optical signals pass through a first OD/OM of head end equipment (HEE).

FIG. 12 shows the RIN values of the TEE output signals after passing through the DWDM link. Referring to FIG. 12, it can be seen that the RIN values are severely decreased when a Gaussian-type OD/OM having relatively narrow wide bandwidths is used. FIG. 13 shows the RIN values of the TEE output signals measured after passing through the first OD/OM of the HEE. As described above, when a Flattop-type first OD/OM is used, the filtering effect is achieved at a lesser extent, compared with the use of the Gaussian-type OD/OM. As a result, an RIN penalty of approximately 1 to 2 dB may be caused.

Accordingly, when an optical signal has an interval of 100 GHz, a transmission rate of 1.25 Gb/s, a signal code of NRZ and a maximum dispersion value of 400 ps/nm/km in the WDM-PON using an incoherent BLS as the seed light source, the wide bandwidths of the second OD/OM and the TEE output signal are preferably set as listed in the following Table 3 so as to transmit an optical signal without an error with no use of forward error correction (FEC) in consideration of the optical passband characteristics of typical AWGs, a noise suppression effect of the RSOA, a filtering effect of the OD/OM, and a chromatic dispersion effect of the optical fiber. Also, since the first OD/OM generally uses the same standard as the second OD/OM, the Flattop-type AWG may also be used as the second OD/OM.

TABLE 3

|  | Bandwidth | Minimum | Maximum |
|---|---|---|---|
| Wide bandwidths of second OD/OM | 1-dB | 50 GHz | 65 GHz |
|  | 2-dB | 60 GHz | 75 GHz |
|  | 3-dB | 70 GHz | 85 GHz |
|  | 10-dB | 100 GHz | 120 GHz |

TABLE 3-continued

|  | Bandwidth | Minimum | Maximum |
|---|---|---|---|
| Wide bandwidths of TEE signal | 1-dB | 55 GHz | 60 GHz |
|  | 2-dB | 65 GHz | 75 GHz |
|  | 3-dB | 70 GHz | 85 GHz |
|  | 10-dB | 105 GHz | 120 GHz |

That is, the first and second OD/OMs may have a minimum 1-dB wide bandwidth of 25 GHz and a maximum 1-dB wide bandwidth of 65 GHz, and a minimum 3-dB wide bandwidth of 45 GHz and a maximum 3-dB wide bandwidth of 85 GHz. Here, the 1-dB wide bandwidth and the 3-dB wide bandwidth refer to positions at which each of 1-dB and 3-dB losses is added to the minimum insertion loss value.

The fact that the performance of the output optical signal is determined according to the bandwidths of the second OD/OM in the DWDM link is the same as described above. In this case, an additional technical point to be considered is crosstalk between channels.

Figure 14:
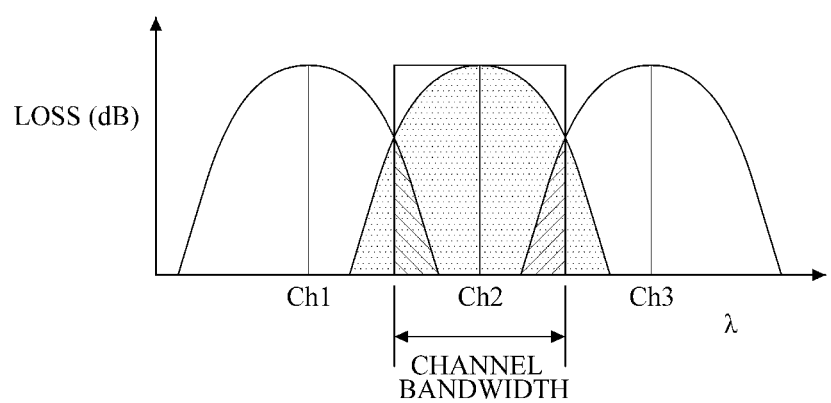
FIG. 14 shows TEE signals expected in a front stage of the HEE in the seed light injection-type WDM-PON in which a broadband light source (BLS) is used as the seed light.

FIG. 14 shows the wavelength-multiplexed TEE signals expected in a front stage of the HEE when the BLS is used as the seed light in the seed light injection-type WDM-PON according to one exemplary embodiment of the present invention.

When the BLS is used as the seed light, the optical spectra of each TEE signal are output in proportion to the transmission characteristics in every channel of the second OD/OM in the DWDM link. Generally, the fact that the AWG is used as the OD/OM in the DWDM link is the same as described above. Crosstalk between channels is caused in the AWG due to the limit to light isolation performance among the physical characteristics of the AWG.

In FIG. 14, a region in which the spectra of one channel overlap the spectra of another channel within the bandwidths of the respective channels (a slashed region) represents crosstalk between the channels.

Especially in the case of the intermediate channels, the light transmission performance may be deteriorated due to such interchannel crosstalk. To reduce the interchannel crosstalk, the bandwidths of the AWG channel may be narrowed to improve light isolation performance. However, the RIN performance of the channels themselves deteriorates due to a decrease in bandwidths of the channels. As a result, the light transmission performance is deteriorated. Such a change in performance is shown in FIG. 15.

Figure 15:
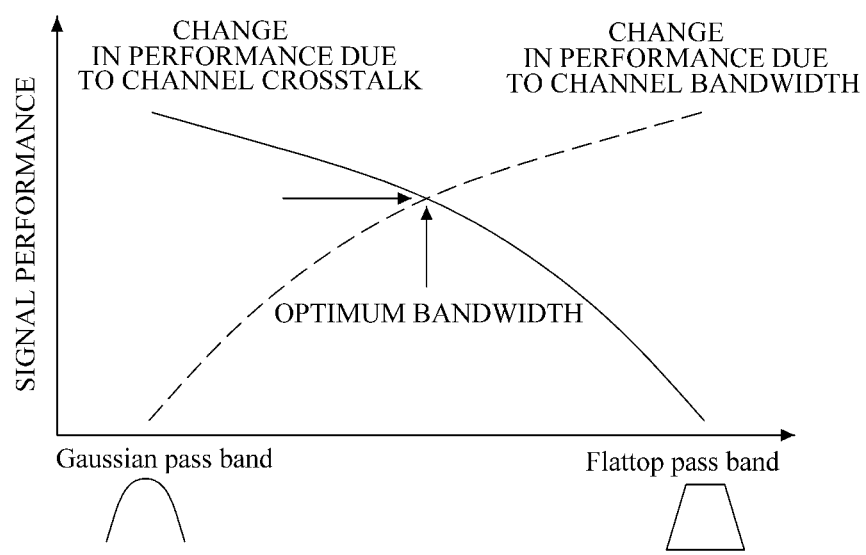
FIG. 15 is a diagram showing variation in signal performance according to interchannel crosstalk and the channel bandwidth in the seed light injection-type WDM-PON in which the BLS is used as the seed light.

As shown in FIG. 15, when the Gaussian passband AWG having relatively narrower wide bandwidths is used as the OD/OM, deterioration of the light transmission performance caused by the interchannel crosstalk may be suppressed, but the light transmission performance may be deteriorated due to the narrowed bandwidths of the channels. On the other hand, when the Flattop passband AWG having wide channel bandwidths is used, the light transmission performance is improved due to the wide bandwidths of the channels, but the light transmission performance is deteriorated due to an increased in interchannel crosstalk.

Therefore, among the bandwidths of the OD/OM used in the seed light injection-type WDM-PON, which transmits a plurality of optical signals, the optimum bandwidths should be selected in consideration of the above-described characteristics. Here, this may be a crossing point between the dotted line and the solid line shown in FIG. 15. Therefore, the wide Gaussian AWG may be used as the OD/OM.

In the case of the wide Gaussian AWG used as the OD/OM, the interchannel crosstalk at a certain AWG channel n is expressed by the difference between the insertion loss at grid wavelength $\lambda n$ of channel n and the insertion loss at grid wavelengths of each channel. Crosstalk at channel n ㅂ 1 wavelengths ($\lambda n-1$ and $\lambda n+1$) is referred to as adjacent crosstalk. Non-adjacent crosstalk is defined by the difference between the insertion loss at $\lambda=\lambda n$ and the maximum insertion loss at a wavelength range of $\lambda \leq \lambda n-1$ and $\lambda \geq \lambda n+1$. The interchannel crosstalk should be as low as possible, but is generally in a range of −25 dB to −35 dB. The AWG used in the seed light injection-type WDM-PON preferably has as low interchannel crosstalk as possible.

Here, the OD/OM is preferably composed of cyclic AWGs which may differently use a wavelength band of an optical signal propagating from the HEE to the TEE and a wavelength band of an optical signal propagating from the TEE to the HEE using the free spectral range characteristics, which are innate characteristics of the AWG. By way of example, it is assumed that an L-band is used as a wavelength band of an optical signal output from the HEE and a C-band is used as a wavelength band of an optical signal output from the TEE in the seed light injection-type WDM-PON, a C-band AWG, an L-band AWG and a plurality of optical couplers configured to couple the C-band AWG and the L-band AWG are required when the OD/OM is not composed of cyclic AWGs. However, when the OD/OM is used as the cyclic AWG, the OD/OM may be simply configured.

More particularly, a signal may be transmitted between the HEE and the DWDM link in both directions, and also be transmitted between the DWDM link and the TEE in both directions. When the same frequencies are used to transmit a signal in both directions, the transmission qualities of the optical signal may be deteriorated due to the reflected signals produced in the DWDM link. Therefore, the signal transmitted from the TEE to the HEE may be set differently from a frequency band of the optical signal, and a signal transmitted from the HEE to the TEE may be set differently from a frequency band of the optical signal.

In the signal transmitted from the TEE to the HEE, a frequency interval specified in the international standard organization such as ITU-T is used as a frequency interval of the optical signal. However, a frequency interval of the optical signal transmitted from the HEE to the TEE is determined according to the frequencies of the OD/OM used in the DWDM link.

A cyclic AWG may be generally used as the OD/OM used in the DWDM link. The cyclic AWG uses physical and optical characteristics which are referred to as a free spectral range. According to such characteristics, when signals having different wavelength bands are input into terminals disposed at one side of the AWG, two optical signals having a difference in wavelengths as many as a free spectral range are output from terminals disposed at the other side of the AWG.

As described above, in the transmission technology of the seed light injection-type WDM-PON, the wavelength band of the signal transmitted from the TEE to the HEE and the wavelength band of the signal transmitted from the HEE to the TEE may be differently used. In this case, when the wavelength band of the signal transmitted from the TEE to the HEE is used at a range of 1,520 nm to 1,565 nm (C-band), the price of optical elements constituting the TEE may be reduced. Also, the wavelength band of the signal transmitted from the HEE to the TEE may be used at a range of 1,570 nm to 1,610 nm (L-band).

In this case, when the cyclic AWG is used in the DWDM link, an interval of the optical signal transmitted from the TEE to the HEE may be formed at an interval of 100 GHz or 50 GHz, as specified by the ITU-T. On the other hand, an interval of the optical signal transmitted from the HEE to the TEE may not be formed at an interval of 100 GHz or 50 GHz specified by the ITU-T due to the characteristics of the cyclic AWG. In general, the interval of the optical signal is formed at an interval of approximately 97 GHz.

A silica material forming the AWG causes a state in which the difference in refractive index according to a temperature is caused, thereby shifting the center frequencies of the AWG. As a result, the difference in transmission bandwidths between two OD/OMs is caused since the center frequencies of the first OD/OM the center frequencies of the second OD/OM are shifted to different extents as the external temperature changes. As a result, the performance of the optical signal may be degraded. Therefore, a temperature control device needs to be additionally installed at the AWG to maintain a constant temperature of the AWG. However, when the OD/OM is used in the DWDM link, power should be supplied to the temperature control device of the AWG, which leads to difficulty of applications. To solve the problem, an a thermal AWG is preferably used in an aspect of applications so that the OD/OM in the DWDM link can have the constant light transmission characteristics regardless of the change in room temperature. The representative a thermal technology includes an input fiber-variable method, a sliced slab waveguide-variable method, and a method using different materials (polymers) having different refractive index characteristics with respect to a temperature.

In the seed light injection-type WDM-PON according to one exemplary embodiment of the present invention, an apparatus and method for measuring the performance of an optical signal will be described. According to exemplary embodiments as will be described later, the configuration of the WDM-PON is based on the WDM-PON described above with reference to FIG. 3. Therefore, the items which are not described herein in detail may be identically applied to the items described above with reference to FIG. 3

Figure 16:
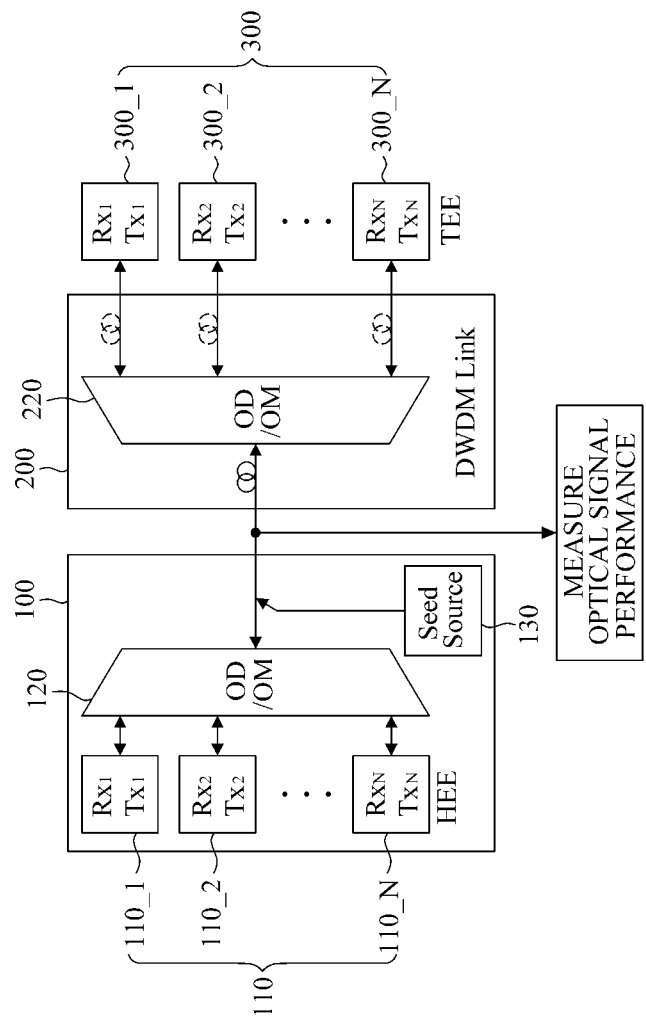
FIG. 16 is a diagram showing the concept of measuring characteristics of an optical signal in the seed light injection-type WDM-PON according to one exemplary embodiment of the present invention.

FIG. 16 is a diagram showing the concept of measuring characteristics of an optical signal in the seed light injection-type WDM-PON according to one exemplary embodiment of the present invention.

The entire configuration of the seed light injection-type WDM-PON shown in FIG. 16 is similar to the above-described configuration of FIG. 3, the performance of an output optical signal of the TEE 300 is measured at a position after the output optical signal passes through the DWDM link 200 and before the output optical signal is input into the HEE 100. For this purpose, an optical signal performance-measuring apparatus 400 may be connected between the second OD/OM 220 and the first OD/OM 120. The kinds of apparatuses for measuring the performance of an optical signal are not particularly limited. Here, a variety of optical receivers may be used herein. In this case, the performance of an optical signal to be measured may include a light intensity, RIN, and an optical eye diagram.

When the optical signal performance-measuring apparatus 400 is an apparatus for measuring an intensity of an output optical signal from the TEE 300, the optical signal performance-measuring apparatus 400 may be an optical signal intensity-measuring apparatus. More particularly, the optical signal performance-measuring apparatus 400 for measuring an intensity of an optical signal functions to measure intensities of optical signals emitted from the TEE 300, more particularly from optical transceivers (Tx) of respective subscriber units of the TEE 300. In this case, the measuring apparatus 400 measures the intensity of the output optical signal by compensating for the loss caused when the output optical signal from the TEE 300 passes through the second OD/OM 220. The loss caused when the output optical signal from the TEE 300 passes through the second OD/OM 220 refers to the loss caused by insertion of the DWDM link 200. In this case, the insertion loss may be a minimum value of the insertion loss of the DWDM link 200. For example, the minimum value may be 3 dB.

As described above, RSOA, FP-LD or REAM used as the TEE Tx functions to receive seed light and amplify and modulate the received seed light. In this case, the TEE Tx outputs an optical signal having the same wavelength band as the wavelengths of the seed light, as well as ASE having the other wavelength bands. This is shown in FIG. 5. Therefore, when an intensity of the optical signal is measured at a front stage of the TEE Tx, an intensity of the ASE is also measured in addition to the intensity of the optical signal. Therefore, a wide band filter for removing the ASE should be used for accurate measurement.

For standardization of the wide band filter, the bandwidth of the seed light is determined by the second OD/OM 220 of the DWDM link 200 in the case of the seed light injection-type WDM-PON. Therefore, the standard of the wide band filter is preferably identical to that of the second OD/OM 220 of the DWDM link 200. As a result, when the intensity of the output optical signal from the TEE 300 is measured, the second OD/OM 220 in the DWDM link 200 is used as the wide band filter for removing the ASE. According to one exemplary embodiment, since a maximum value of loss caused by the second OD/OM 220 is given, the maximum value of loss may be applied to calculate an intensity of the output optical signal from the TEE 300 for the second OD/OM 220 in the DWDM link 200. The maximum value of loss caused by the second OD/OM 220 of the DWDM link 200 is in a range of approximately 5 dB to 6 dB.

Meanwhile, since the RIN and optical eye diagram are values measured regardless of loss at the second OD/OM 220, there is no need to compensate for the loss.

[Mode for Invention]

Figure 17:
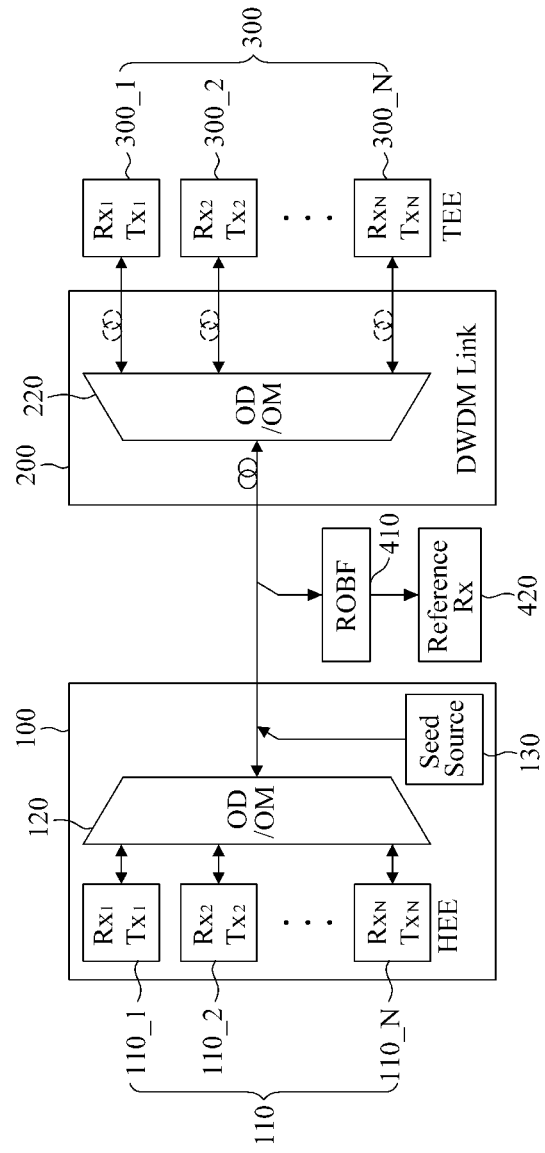
FIG. 17 is a diagram showing the configuration of a seed light injection-type WDM-PON according to another exemplary embodiment of the present invention.

FIG. 17 is a diagram showing the configuration of a seed light injection-type WDM-PON according to another exemplary embodiment of the present invention. The configuration of the WDM-PON shown in FIG. 17 may be one exemplary embodiment of the WDM-PON shown in FIG. 16. That is, the optical signal performance-measuring apparatus 400 shown in FIG. 16 is configured to include an optical filter 410 and an optical receiver 420, as shown in FIG. 17. Hereinafter, on the basis of the different times described above, this exemplary embodiment will be described with reference to FIGS. 3 and 16.

As shown in FIG. 17, since the first OD/OM 120 and the optical transceivers (110: 110_1, 110_2, ..., 110_N) included in the HEE 100 may have different characteristics according to manufacturers, the optical characteristics of optical signals are preferably measured before the optical signals are input into the HEE 100. As a result, according to one exemplary embodiment of the present invention, an optical filter 410 and an optical receiver 420, which may separate some of optical signals wavelength-multiplexed at the front stage of the HEE 100 using a tap, wavelength-demultiplex each of the signals and separate the wavelength-demultiplexed signals, are connected to measure the optical characteristics of each signal. Here, the optical filter 410 and the optical receiver 420 are connected to a signal processing unit (not shown) so that the optical filter 410 can be driven according to motion information provided from the optical receiver 420.

The structure of the optical filter of the optical signal performance-measuring apparatus according to one exemplary embodiment of the present invention will be described in detail.

The optical filter of the optical signal performance-measuring apparatus is used to separate each signal whose characteristics are intended to be measured. Therefore, an optical filter having the same transmission characteristics as the wide bandwidths of a signal to be measured is preferably used. Here, the optical filter reduces the intensities of adjacent signals as small as possible so that the intensities of the adjacent signals cannot affect measurement of the performance of a wavelength-divided signal. More particularly, the difference in intensity between an optical signal to be measured and its adjacent signals is preferably equal to or more than 20 dB.

However, in the communication system having a wavelength division multiplexing mode using the seed light as the signal light source as described in the exemplary embodiments of the present invention, the optical signal has a wide line width of several tens of GHz, unlike the communication system having a wavelength division multiplexing mode using a typical laser diode as the signal light source. As a result, a filter suitable for the bandwidths of the optical signal should be designed.

Figure 18:
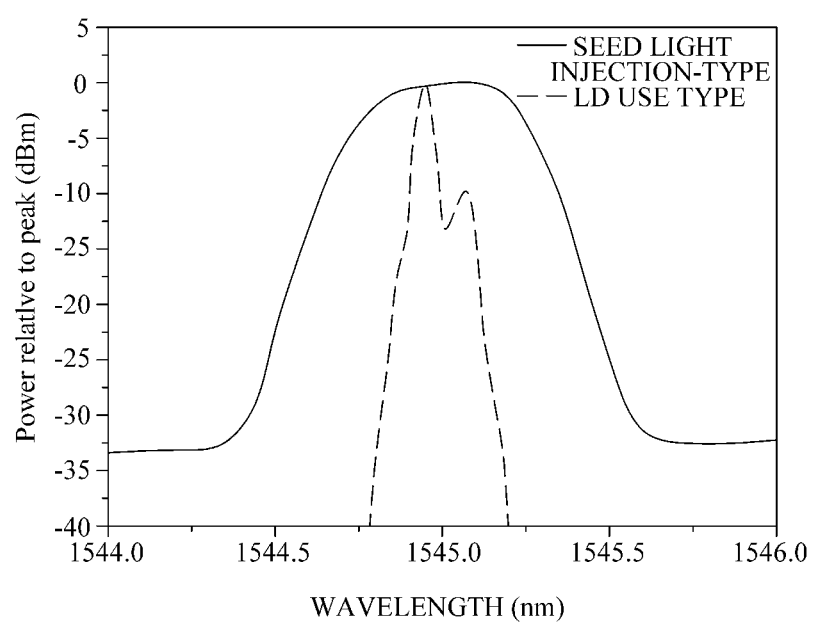
FIG. 18 shows the difference in bandwidths of signals in a typical WDM system and a WDM system using a seed light source.

FIG. 18 shows the difference in bandwidths of signals in a typical WDM system and a WDM system using a seed light source. As seen from the spectra of output optical signals shown in FIG. 18, a signal may be wavelength-divided using the OD/OM 220 used in the DWDM link 200 in the case of a mode using an LD. In the case of the seed light injection-type, however, when a signal is wavelength-divided using the OD/OM 220, the performance of the optical signal may be degraded due to optical loss of the signal caused during the wavelength division.

Figure 19:
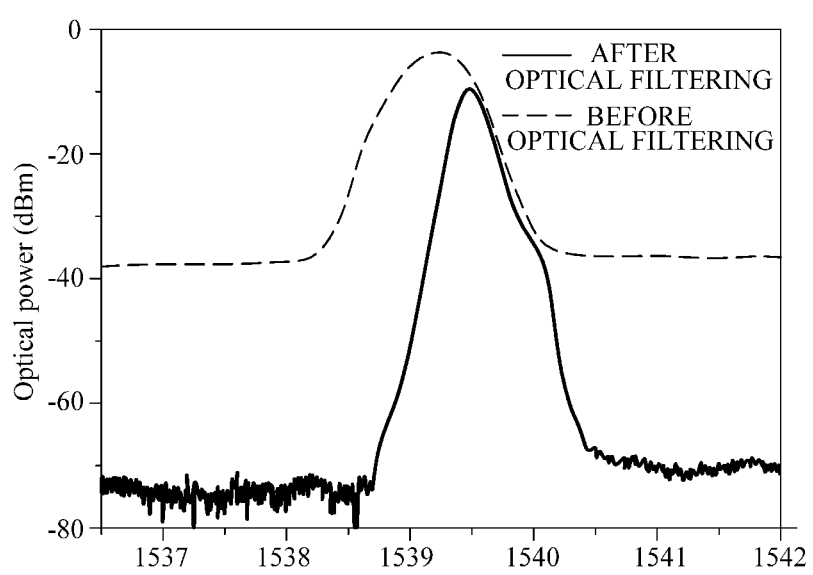
FIG. 19 is a graph illustrating deterioration of optical characteristics which may be caused due to optical loss of a signal.
Figure 20:
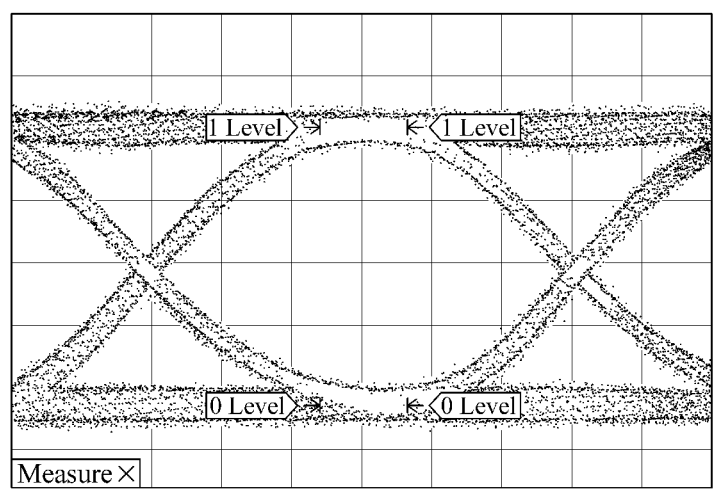
FIG. 20 shows a signal before optical filtering.
Figure 21:
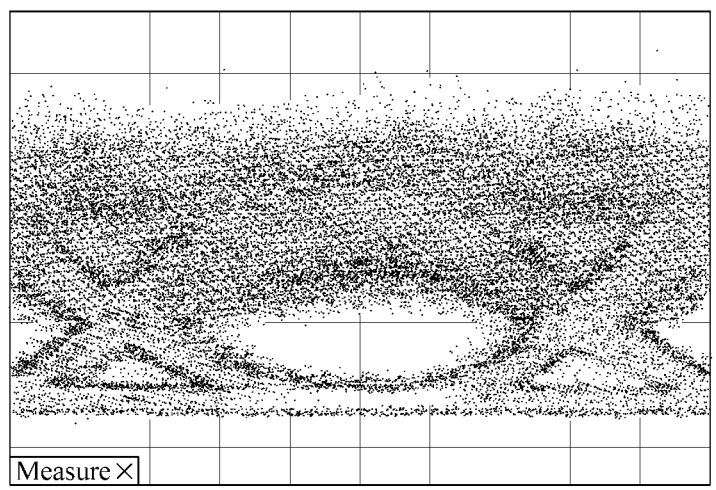
FIG. 21 shows a signal after optical filtering.

FIG. 19 is a graph illustrating deterioration of optical characteristics which may be caused due to optical loss of a signal, and FIGS. 20 and 21 shows signals before optical filtering and after the optical filtering, respectively. When a short wavelength band of the optical signal is lost due to the optical filtering as shown in FIG. 19, it can be seen that the characteristics of the signal are deteriorated, as shown in FIG. 21.

Figure 22:
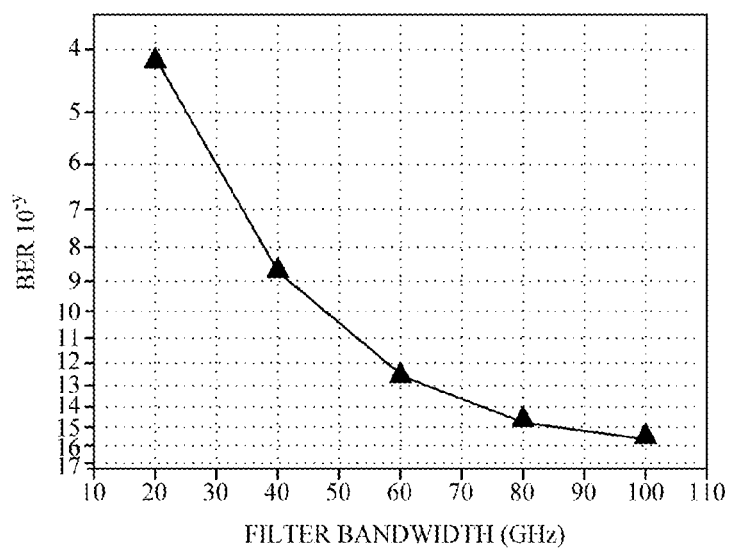
FIG. 22 is a graph illustrating a change in bit error rate (BER) value of a filtered signal according to bandwidth of a filter.
Figure 23:
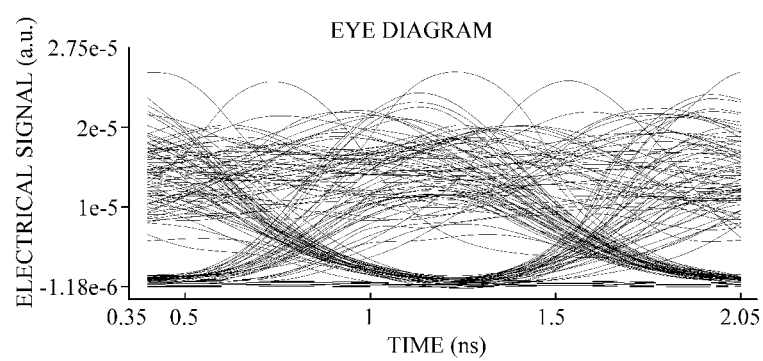
FIGS. 23 to 25 are eye diagrams of electric signals when bandwidths of each filter are 20 GHz, 60 GHz, and 100 GHz.
Figure 24:
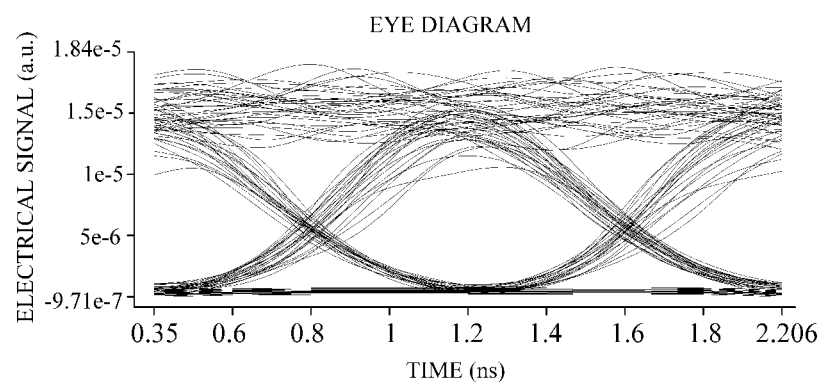
Figure 25:
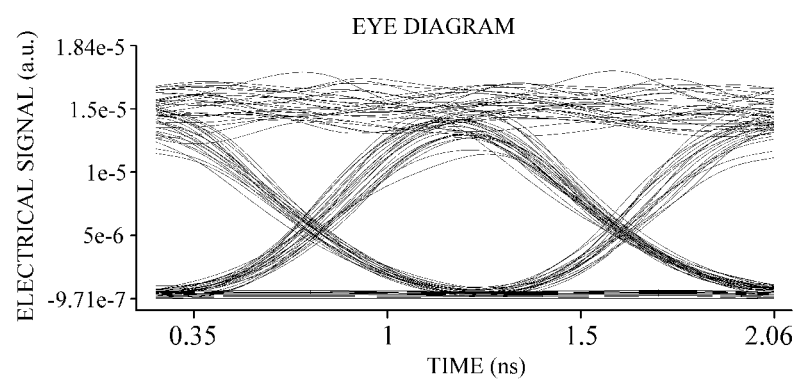

FIG. 22 is a graph illustrating a change in BER value of a filtered signal according to bandwidth of a filter, and FIGS. 23, 24 and 25 show eye diagrams of electric signals when bandwidths of each filter are 20 GHz, 60 GHz, and 100 GHz, respectively. As shown in FIGS. 22 to 25, it can be seen that the transmission qualities of a signal are deteriorated as bandwidth of a filter becomes narrow. As a result, it can be seen that a filter for minimizing an effect on the qualities of the signal should have a bandwidth of 80 GHz or more. Also, the optical filter of the optical signal performance-measuring apparatus according to one exemplary embodiment of the present invention is preferably in a Butterworth shape or a shape similar to a substantially rectangular shape. This is intended so that the difference in intensity between a signal to be measured after the optical filtering and adjacent signals is equal to or more than 20 dB.

Figure 26:
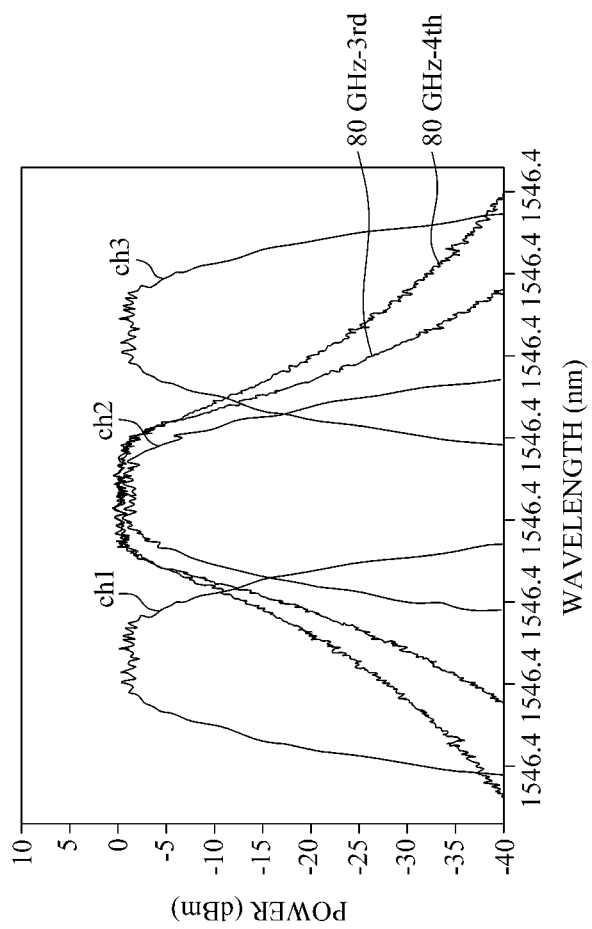
FIG. 26 is a graph illustrating the transmission characteristics of a Butterworth-type optical filter and the output spectra of an optical signal comparing the differences in intensity of signals with the varying Butterworth order.

FIG. 26 is a graph illustrating the transmission characteristics of a Butterworth-type optical filter and the output spectra of an optical signal comparing the differences in intensity of signals with the varying Butterworth order. As shown in FIG. 26, it can be seen that, as the Butterworth order increases, the transmission characteristics of a filter according to the wavelengths are steeply formed, which leads to an increase in loss of adjacent optical signals.

The following Table 4 lists the differences in light intensity of a signal to be measured and adjacent signals measured when the signal to be measured and the adjacent signals pass through a Butterworth-type wide band filter.

TABLE 4

| Butterworth order | | Measured channel | Adjacent channel 1 | Adjacent channel 2 |
|---|---|---|---|---|
| 4th order | Light intensity of each signal | −21.5 dBm | −45.74 dBm | −45.3 dBm |
| | Difference in light intensity | | 24.24 dB | 23.8 dB |
| 3rd order | Light intensity of each signal | −21.6 dBm | −41.2 dBm | −40.84 dBm |
| | Difference in light intensity | | 19.6 dB | 19.24 dB |

As shown in Table 4, the difference in light intensity between a channel to be measured and adjacent channels increases as the Butterworth order increases. As a result, the Butterworth-type optical filter is used as the optical filter of the optical signal performance-measuring apparatus. In this case, an optical filter having a substantially rectangular shape is preferably used.

As one exemplary embodiment of the optical filter of optical signal performance-measuring apparatus according to the present invention, an optical filter may be formed from a combination of a high-pass filter and a low-pass filter, both of which are wavelength-variable. In this case, loss of the optical signal may be minimized by adjusting the operating wavelengths of the high-pass filter and the low-pass filter even when the bandwidths of an optical signal are shifted, followed by adjusting the transmission bandwidths of the filters suitable for the bandwidths of the optical signal.

Figure 27:
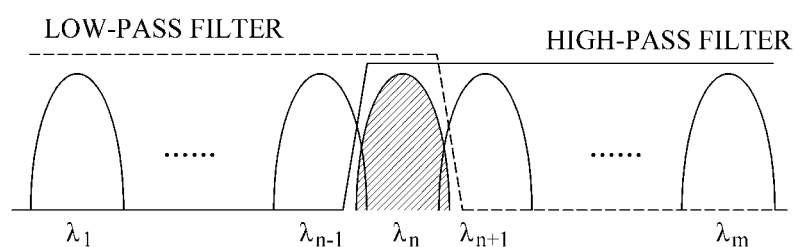
FIG. 27 shows a method of wavelength-dividing an optical signal using a high-pass filter and a low-pass filter.

FIG. 27 shows a method of wavelength-dividing an optical signal using the high-pass filter and the low-pass filter. As shown in FIG. 27, the high-pass filter may be used to cut off an optical signal having a wavelength of $\lambda_n-1$ or less, and the low-pass filter may be used to cut off an optical signal having a wavelength of $\lambda_n+1$ or less, thereby extracting an optical signal having a wavelength of $\lambda_n+1$.

Figure 28:
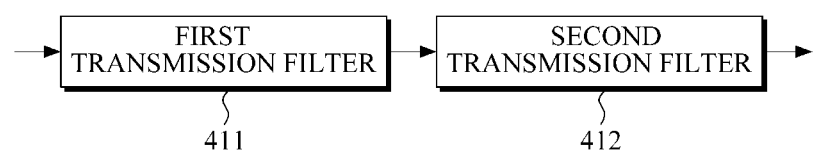
FIG. 28 shows the configuration of a wavelength-variable optical filter according to one exemplary embodiment of the present invention.

FIG. 28 shows the configuration of a wavelength-variable optical filter according to one exemplary embodiment of the present invention. As shown in FIG. 28, the wavelength-variable optical filter according to one exemplary embodiment of the present invention includes a first transmission filter 411 and a second transmission filter 422. The first transmission filter 411 may be composed of a low-pass filter or a high-pass filter, and the second transmission filter 422 may be composed of a low-pass filter or a high-pass filter according to the configuration of the first transmission filter. In this case, since each filter can adjust the operating wavelengths, the operating wavelengths may be adjusted so that the operating wavelengths can be suitable for the wavelengths of a signal to be transmitted.

In the optical signal performance-measuring apparatus according to one exemplary embodiment of the present invention, the operating wavelengths of the wavelength-variable optical filter is set to such an extent that deterioration of the qualities of a filtered optical signal can be minimized. In this case, the qualities of the optical signal may be determined using RIN, etc.

Figure 29:
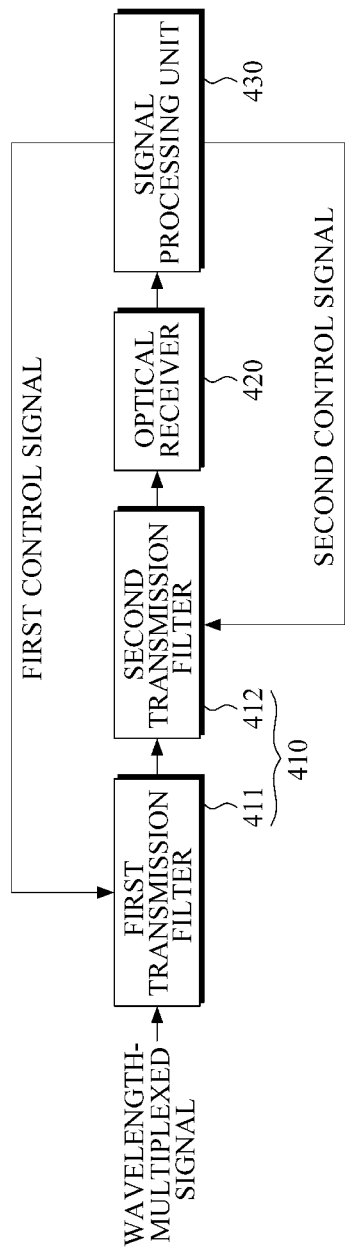
FIG. 29 schematically shows the configuration of an optical signal performance-measuring apparatus according to one exemplary embodiment of the present invention.

FIG. 29 schematically shows the configuration of an optical signal performance-measuring apparatus according to one exemplary embodiment of the present invention. As shown in FIG. 29, the optical signal performance-measuring apparatus according to one exemplary embodiment of the present invention includes an optical filter unit 410, an optical receiver 420 and a signal processing unit 430. Here, the optical filter unit 410 includes a first transmission filter 411 and a second transmission filter 412. The signal processing unit 430 produces first and second control signals configured to control the first transmission filter 411 and the second transmission filter 412 according to the qualities of an optical signal received at the optical receiver 420, and provides the first and second control signals to the first transmission filter 411 and the second transmission filter 412, respectively.

Hereinafter, a method of operating another wavelength-variable optical filter according to one exemplary embodiment of the present invention will be described.

Figure 30:
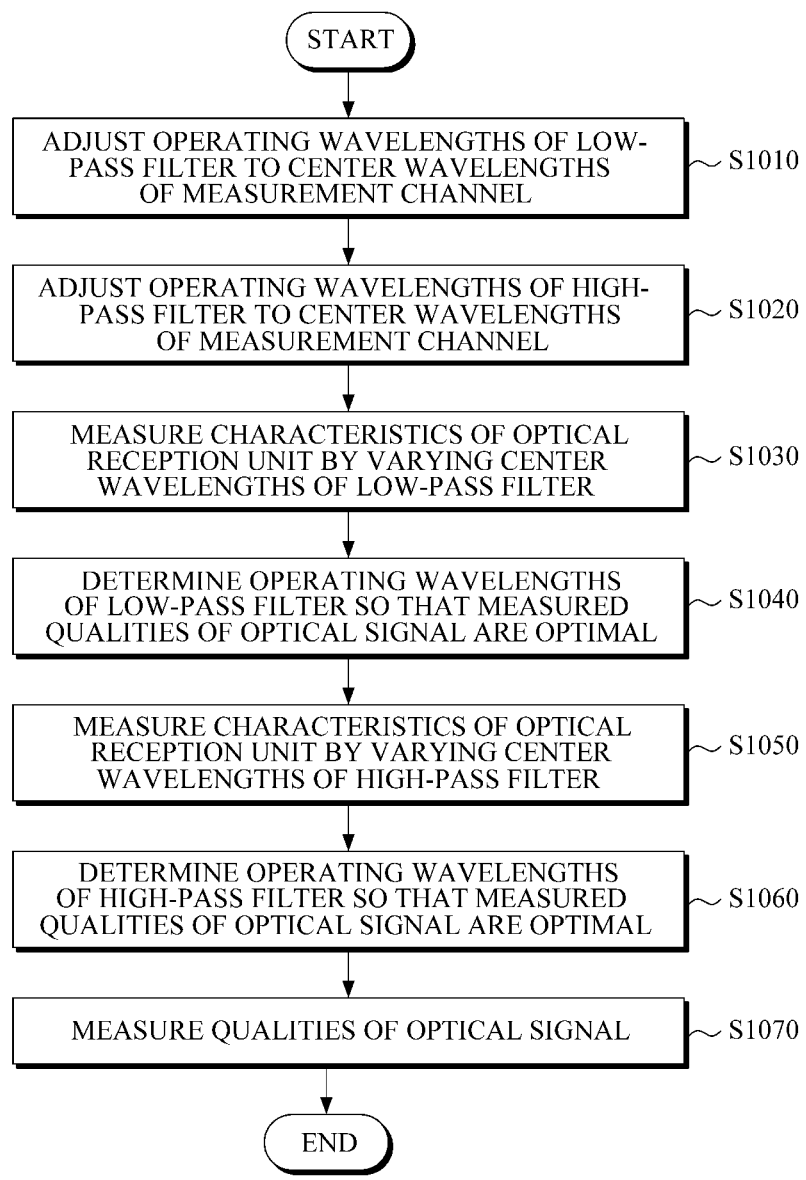
FIG. 30 is a flowchart illustrating a method of operating a wavelength-variable optical filter according to one exemplary embodiment of the present invention.
Figure 31:
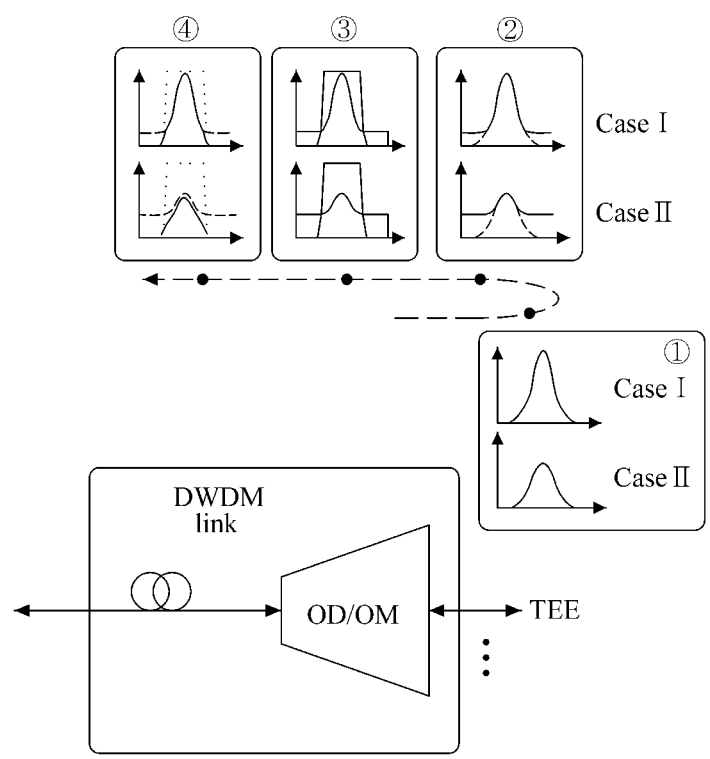
FIG. 31 is a diagram showing how slicing loss changes according to the light intensity of seed light injected into the TEE.

FIG. 30 is a flowchart illustrating a method of operating a wavelength-variable optical filter according to one exemplary embodiment of the present invention. As shown in FIG. 31, first, the operating wavelengths of a low-pass filter matches the center wavelengths of a channel to be measured (S1010). Next, the operating wavelengths of a high-pass filter matches the center wavelengths of a channel to be measured (S1020). In this case, the characteristics of an optical reception unit are measured while varying the center wavelengths of the low-pass filter (S1030), and the operating wavelengths of a filter are determined so that the qualities of the measured optical signal can be optimized (S1040). Thereafter, the characteristics of the optical reception unit are measured while varying the center wavelengths of the high-pass filter (S1050), and the operating wavelengths of the filter are determined so that the qualities of the measured optical signal can be optimized (S1060). When the operating wavelengths are determined as described above, the qualities of the optical signal are measured (S1070). When the measurement is completed, this operation is finished, or the above-described operations are repeatedly performed after returning to Operation S1010 so as to measure the characteristics of adjacent channels. However, those skilled in the art will understand that the above-described operations may be performed regardless of an operation sequence of the low-pass filter and the high-pass filter.

As described above, the measurement bandwidths may be variably adjusted according to the bandwidths of the optical signal by wavelength-dividing the optical signal and measuring characteristics of the optical signal using the wavelength-variable optical filter. Also, the accuracy of the transmission qualities of the measured signal may be improved since an effect of the adjacent channels may be minimized.

Next, the seed light injection-type WDM-PON according to another exemplary embodiment of the present invention will be described. This exemplary embodiment is associated with measurement of an intensity of an optical signal as one example of measuring the optical performance in the WDM-PON.

An easy method of determining stable communication of an optical signal is to determine whether a light intensity of the output signal from the HEE (or TEE) falls within the reception sensitivity of an optical receiver disposed at the TEE (or HEE) after consideration of loss caused in the DWDM link. In this case, the loss caused in the DWDM link, which is considered in the ITU-T standard document, includes OD/OM insertion loss, optical pass loss, optical fiber insertion loss, etc. Unlike the case in which a light source having a narrow line width such as a laser diode is used, a saturation level of incoherent modes is changed according to the light intensity of the seed light, which is spectrum-sliced and injected into the TEE, in the case of a WDM optical communication system using the incoherent BLS as the seed light. As a result, components of the less saturated optical signal are multiplexed through the OD/OM disposed in the DWDM link, which leads to additional loss.

This will be described in further detail with reference to FIG. 31. FIG. 31 is a diagram showing how slicing loss changes according to the light intensity of seed light injected into the TEE. Here, two cases in which the wavelength-divided seed light has a high intensity (Case I) and a low intensity (Case II) are shown.

Panel ① of FIG. 31 shows the optical output spectra for two cases in which the spectrum-sliced seed light injected into the TEE 300 has a high intensity (Case I) and a low intensity (Case II). Panel ② of FIG. 31 shows the optical power of the TEE 300 after mode locking for the two cases of the seed light intensities. Panel ③ of FIG. 31 shows a procedure of multiplexing the optical power of the TEE 300 through the second OD/OM 220 in the DWDM link 200. In this case, an optical signal in a region indicated by grey is cut off. Thus, it can be seen that a region of the optical signal to be cut off is differently determined according to the light intensity of the seed light which is spectrum-sliced and injected into the TEE 300. Panel ④ of FIG. 31 shows optical signals which are multiplexed through the second OD/OM 220 and transmitted toward the HEE 100.

Figure 32:
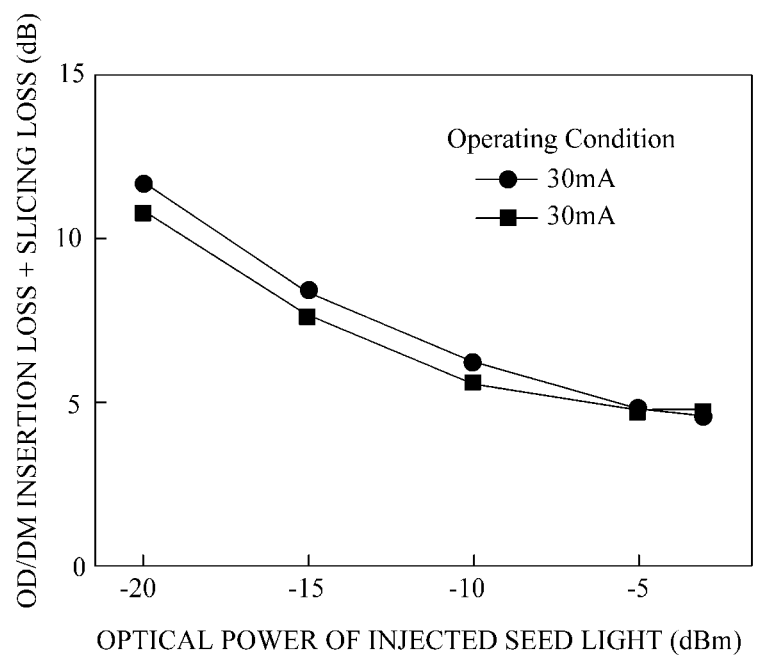
FIG. 32 is a graph of slicing loss versus light intensity of seed light injected into the TEE and operating conditions of the TEE.

In the case of the WDM-PON sing the incoherent BLS as the seed light as described above, the additional loss (slicing loss) caused during the multiplexing operation at the second OD/OM 220 exists in addition of loss caused at the DWDM link 200 that is generally considered. Such slicing loss may not be converted into any numerical value unlike the other loss caused in the DWDM link 200 since a suppression level of incoherent modes varies according to the light intensity of seed light injected as shown in FIG. 32 and operating conditions of the wavelength-independent light source disposed at the TEE 300.

Therefore, according to one exemplary embodiment of the present invention, a reference optical bandpass filter (ROBF) is provided in the front stage of the TEE to determine whether the optical output intensity of the TEE is sufficient to perform stable communication of an optical signal in the WDM optical communication system, and optical output intensity of the TEE is then checked using the ROBF. That is, to minimize the difference in loss caused by the additional loss (slicing loss) incurred during an operation of multiplexing a signal output from the TEE 300 through second OD/OM 220 in the DWDM link 200, an optical filter is used to separate a TEE output signal. In this case, after the bandwidths of the optical filter are possibly set at channel intervals of the second OD/OM, it is necessary to measure an intensity of the separated optical signal. As a result, the constant intensity of the TEE output signal may be measured even when a suppression level of the incoherent modes varies according to the light intensity of the seed light and operating conditions of the wavelength-independent light source disposed at the TEE 300. Thus, the difference in additional loss by the second OD/OM does not take place. Therefore, the significant optical output intensity of the TEE may be checked by separating only an optical signal of a channel through which the stable communication probability is to be checked.

Figure 33:
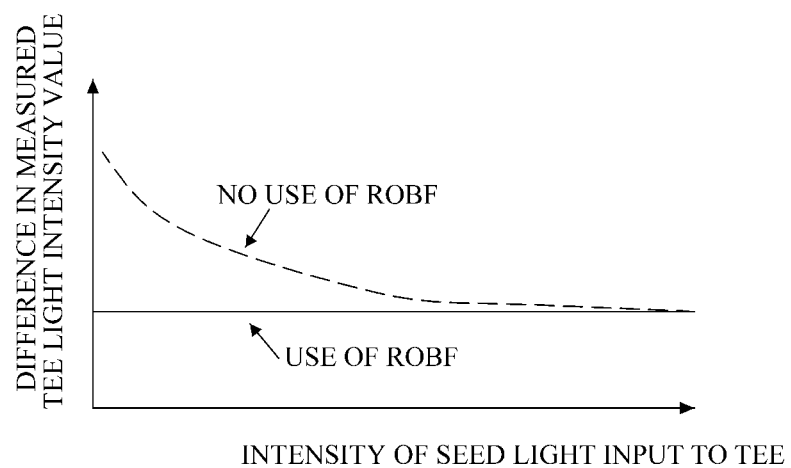
FIG. 33 is a graph comparing light intensity of TEE measured in a rear stage of the DWDM link after a reference optical bandpass filter (ROBF) is installed at a front stage of the TEE according to one exemplary embodiment of the present invention, with that of the prior art.

FIG. 33 is a graph comparing TEE light intensity, which is obtained by installing an ROBF 510 at a front stage of the TEE 300 according to one exemplary embodiment of the present invention to measure a light intensity and comparing the measured light intensity with the TEE light intensity at a rear stage of the DWDM link, with that of the prior art. As shown in FIG. 33, the light intensity of a signal is measured at the front stage of the TEE in the same manner as in a conventional technique which does not use an ROBF, and the light intensity of a signal is measured at the rear state of the DWDM link. Then, when the light intensities of the two signals are compared with each other, the difference in comparison value is caused according to the intensity of the seed light input into the TEE. However, when the light intensity of a signal is measured at the front stage of the TEE using an ROBF, the light intensity of a signal is measured at the rear stage of the DWDM link, and the light intensities of the two signals are compared with each other, it can be seen that a change in light intensity value measured according to the intensity of the seed light input into the TEE is not caused. That is, it can be seen that the difference in loss caused by the additional loss (slicing loss) incurred during the multiplexing process through the second OD/OM 220 becomes uniform.

That is, when the light intensity is measured at the front stage of the TEE in the same manner as in a conventional technique, a relatively higher light intensity may be measured during the actual communication due to the effect of the TEE on ASE, compared with the signal transmitted at certain wavelengths according to the wavelength of a seed light which is a significant signal. As described above, however, when the light intensity is measured at the front stage of the TEE using the ROBF, the effect of the TEE on the ASE may be minimized Based on the facts, when the light intensity is compared with the light intensity of the signal measured at the rear stage of the DWDM link, it is possible to determine whether the stable communication is possible based on the measured light intensity. Therefore, when the TEE output signal is measured using the ROBF according to one exemplary embodiment of the present invention, it is possible to obtain a significant light intensity.

Figure 34:
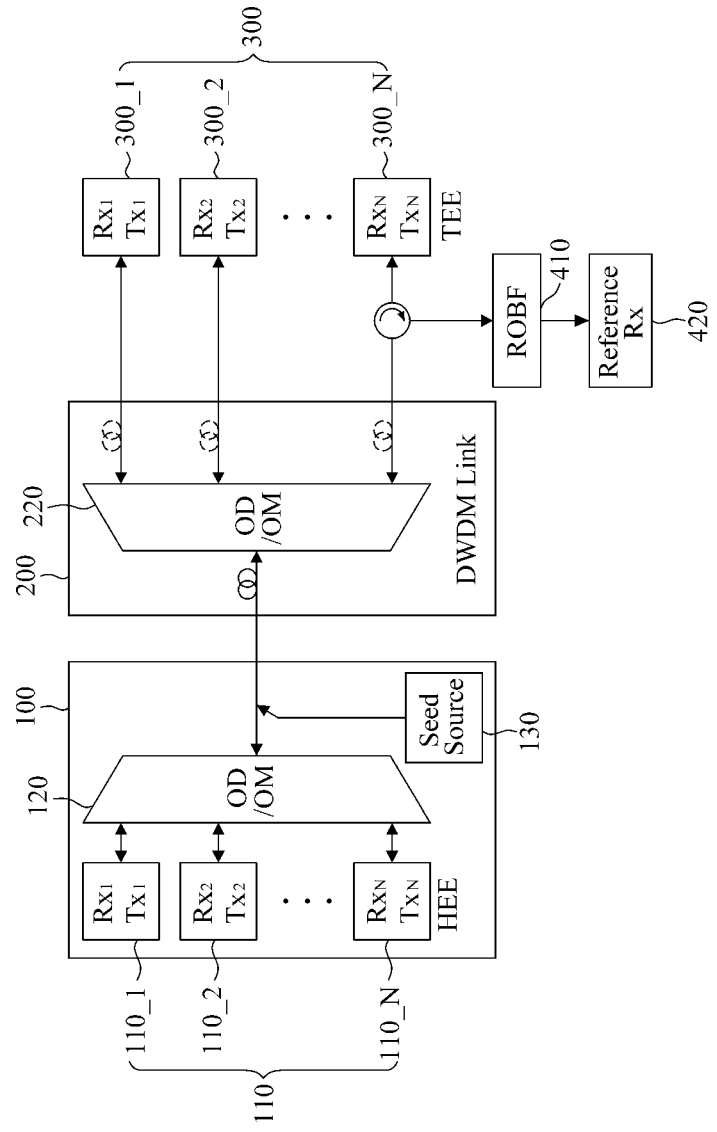
FIG. 34 is a diagram showing an apparatus for measuring light intensity of a TEE output signal according to one exemplary embodiment of the present invention provided in the WDM-PON.

FIG. 34 is a diagram showing the configuration of a seed light injection-type WDM-PON according to another exemplary embodiment of the present invention. The configuration of the WDM-PON shown in FIG. 34 may be one exemplary embodiment of the WDM-PON provided with an apparatus for measuring the above-described light intensity of the TEE output signal. Hereinafter, on the basis of the different times described above, this exemplary embodiment will be described with reference to FIGS. 3, 16 and 17.

FIG. 34 is a diagram showing the WDM-PON according to one exemplary embodiment of the present invention. As shown in FIG. 34, an ROBF 510 and an optical receiver 520 are installed at the front stage of the TEE 300. The ROBF 510 is composed of a wavelength-variable filter. In this case, a wavelength-variable filter whose bandwidths are fixed may be used. However, when the bandwidths of an optical signal are changed, another wavelength-variable filter should be used. Therefore, to solve the problem, a high-pass filter and a low-pass filter are connected in series to form a wavelength-variable filter, which may be used herein. The method of wavelength-dividing an optical signal using the high-pass filter and the low-pass filter has been described with reference to FIG. 27. Therefore, description of the method is omitted for clarity.

Figure 35:
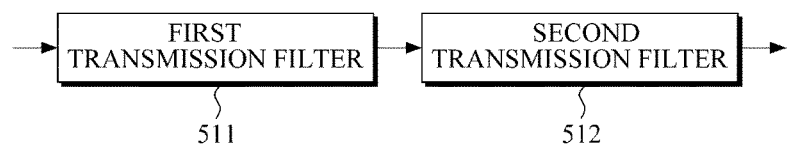
FIG. 35 shows the configuration of a wavelength-variable optical filter according to one exemplary embodiment of the present invention.

FIG. 35 shows the configuration of a wavelength-variable optical filter according to one exemplary embodiment of the present invention. As shown in FIG. 35, the wavelength-variable optical filter 510 according to this exemplary embodiment includes a first transmission filter 511 and a second transmission filter 512. The first transmission filter 511 may be composed of a low-pass filter or a high-pass filter, and the second transmission filter 512 may be composed of a low-pass filter or a high-pass filter according to the configuration of the first transmission filter 511. In this case, since each of the filters 511 and 512 can adjust the operating wavelengths, the operating wavelengths may be adjusted so that the operating wavelengths can be suitable for the wavelengths of a signal to be transmitted.

Figure 36:
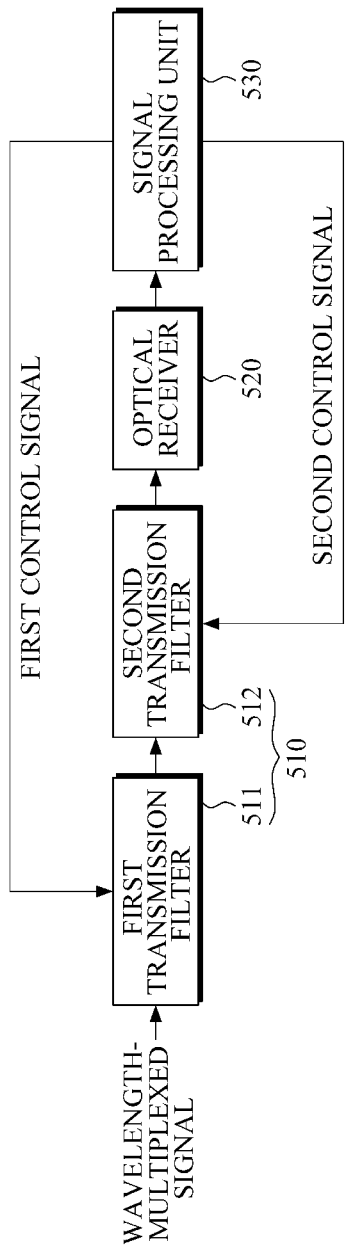
FIG. 36 schematically shows the configuration of an optical signal performance-measuring apparatus according to one exemplary embodiment of the present invention.

In the TEE light intensity-measuring apparatus provided in the WDM-PON according to this exemplary embodiment, the operating wavelength of the wavelength-variable optical filter are set to such an extent that deterioration of the qualities of a filtered optical signal can be minimized. In this case, the qualities of the optical signal may be determined using RIN, etc. FIG. 36 schematically shows the configuration of the TEE light intensity-measuring apparatus. As shown in FIG. 36, the TEE light intensity-measuring apparatus according to one exemplary embodiment of the present invention includes an optical filter unit 510, an optical receiver 520 and a signal processing unit 530. Here, the optical filter unit 510 includes a first transmission filter 511 and a second transmission filter 512. The signal processing unit 530 produces first and second control signals configured to control the first transmission filter 511 and the second transmission filter 512 according to the qualities of an optical signal received at the optical receiver 520, and provides the first and second control signals to the first transmission filter 511 and the second transmission filter 512, respectively. A method of operating such a wavelength-variable optical filter is performed in the same manner as in the wavelength-variable optical filter described above with reference to FIG. 30. Therefore, specific description of the method is omitted for clarity.

Hereinafter, in the seed light injection-type WDM-PON according to one exemplary embodiment of the present invention, an optical eye mask defining the performance of a TEE optical signal and a signal decision threshold value of the optical receiver of the HEE will be described.

Figure 37:
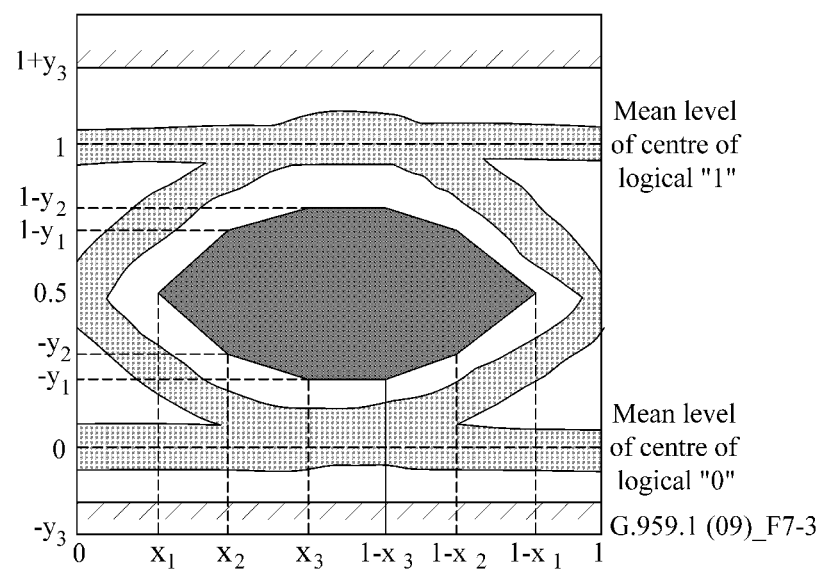
FIG. 37 shows an optical eye mask specified in ITU-T G.959.1.

An optical eye mask is generally used to measure the optical modulation performance of a Tx. FIG. 37 shows an optical eye mask specified in ITU-T G.959.1, which corresponds to the case of a passive optical network using an LD as the Tx. In the case of the WDM-PON using the LD as the Tx, noise levels of level "1" and level "0" of a modulated optical signal are very low due to high coherent characteristics of the LD. As shown in FIG. 37, a crossing level of the optical eye mask specified in the ITU-T G.959.1 is set to 50%. This is because the level "1" and level "0" have the same noise level.

Figure 38:
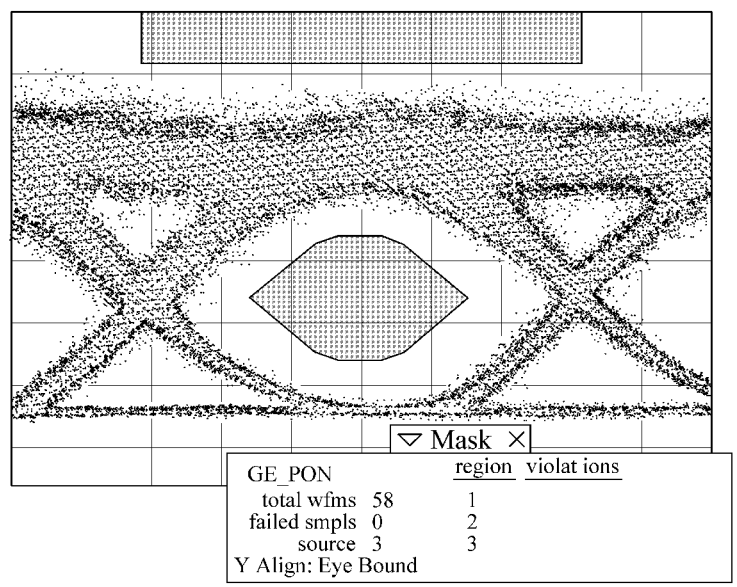
FIG. 38 shows an optical eye diagram of an optical signal after the optical signal passes through a second OD/OM arranged in a DWDM link in a seed light injection-type WDM-PON in which a BLS is used as the seed light.

As described above, however, in the seed light injection-type WDM-PON using the BLS as the seed light, an RIN value of the seed light input into the TEE 300 is very higher than that of the LD. Therefore, an output optical signal of the TEE Tx is output in a state in which the level "1" has more noise components than the level "0". In particular, since an optical eye diagram shown in FIG. 38 is observed after the optical signal passes through the OD/OM in the DWDM link, a crossing level is formed below 50% of the optical eye diagram. Therefore, the optical eye mask having standard specifications as shown in FIG. 37 may not be used in the case of the seed light injection-type WDM-PON. Thus, an optical eye mask having a structure in which a crossing level is largely shifted downwards should be used to measure the accurate optical modulation performance.

Figure 39:
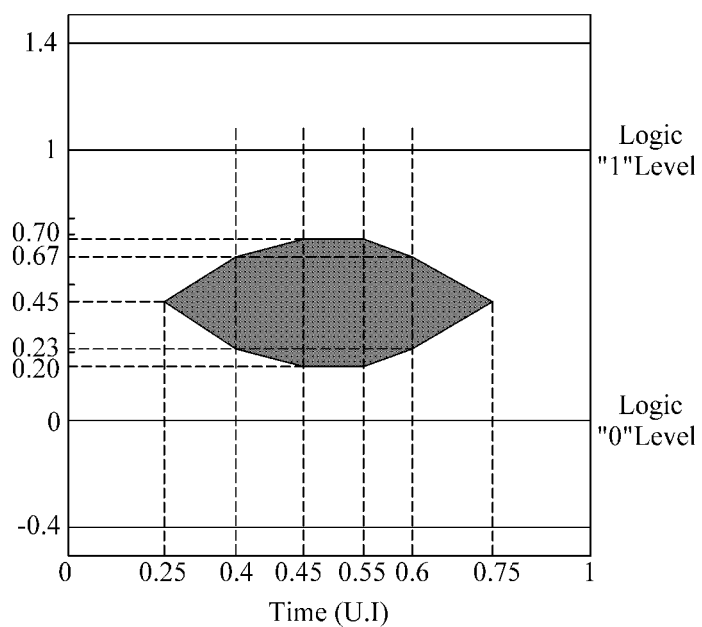
FIG. 39 shows an optical eye mask in consideration of an optical eye diagram experimentally measured in a seed light injection-type WDM-PON in which the BLS is used as seed light.

The optical eye mask suitable for the TEE Tx of the seed light injection-type WDM-PON is preferably determined as shown in FIG. 39 in consideration of an experimentally measured optical eye diagram. The TEE output signal satisfying such an optical eye mask is input into the HEE through the DWDM link, and wavelength-demultiplexed while passing through the OD/OM of the HEE, and then input into each Rx. Therefore, the Rx of the HEE should convert an optical signal into an electrical signal in consideration of the crossing level set at the optical eye mask of the TEE signal. That is, when the received optical signal is converted into an electrical signal, a threshold value used to estimate the level "0" and the level "1" may vary according to a necessity. Thus, the threshold value preferably varies from 0.45 to 0.35 in consideration of the optical eye mask of the TEE signal. In this case, the decision threshold value corresponds to a value when an intensity of level "1" of the modulated optical signal is set to "1." On the other hand, the decision threshold value may be expressed by 45% to 35%. For this purpose, the Rx of the HEE is preferably configured to include a photodiode configured to convert an optical signal into an electrical signal and output the electrical signal, and a threshold varying apparatus configured to vary a signal decision threshold value as necessary, in addition to an amplification unit configured to linearly amplify the converted electrical signal and convert the linearly amplified electrical signal into a voltage signal.

Meanwhile, the number of wireless base stations is increased in recent years to handle exponentially increasing wireless data traffic. Thus, the importance of a wireless backup network configured to connect a wireless base station to a mobile base station is also increased. In the case of 4G wireless network, the access standard of a wireless backup network is selected as a Gigabit Ethernet or common public radio interface (CPRI) standard according to the configuration of eNodeB used as the wireless base station.

Figure 40:
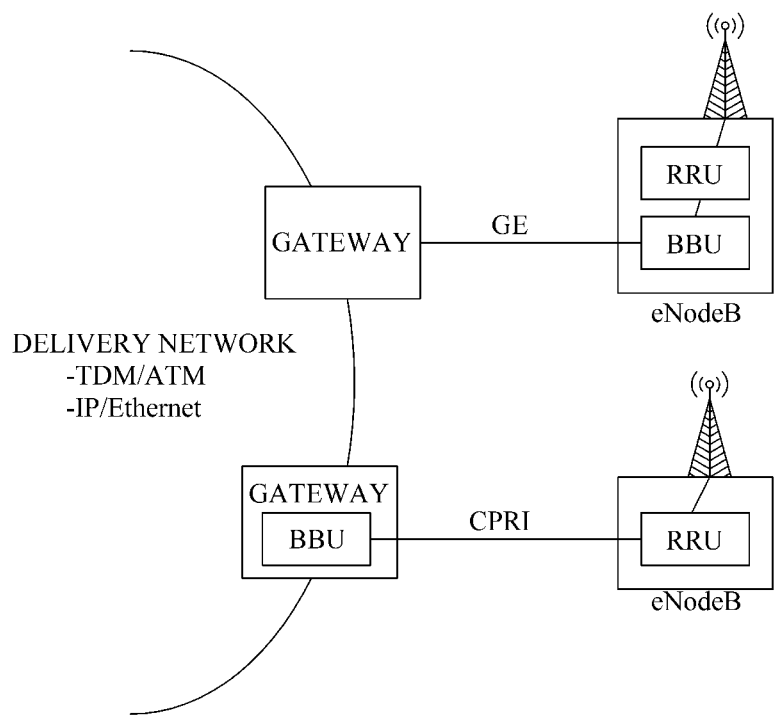
FIG. 40 shows a wireless backup network.

FIG. 40 is a schematic diagram of a 4G wireless backup network. As shown in FIG. 40, when a remote RF unit (RRU) and a baseband unit (BBU) are included inside the eNodeB, the Gigabit Ethernet is used to connect the eNodeB to a gateway. When the gateway of the BBU is shifted to simplify the eNodeB, the eNodeB and the gateway are connected using the CPRI standard. In the case of CPRI, a data transmission rate is standardized into 9.8304 Gb/s, 6.144 Gb/s, 3.072 Gb/s, 2.4576 Gb/s, 1.2288 Gb/s, and 0.6144 Gb/s.

Therefore, to apply the seed light injection-type WDM-PON to such a wireless backup network, the TEE Tx should have a modulation rate of approximately 6 Gb/s or more. However, optical transceivers having a transmission rate of approximately 2.5 Gb/s is generally used for the CPRI. This is achieved in consideration of the compatibility and the transmission rate standardized by the typical ITU-T. Therefore, a transmission rate of the seed light injection-type WDM-PON is preferably approximately 2.5 Gb/s. That is, the transmission rate of the seed light injection-type WDM-PON may be set to such an extent that the transmission rate can be suitable for the transmission standard specified by the international standard organization such as ITU-T, IEEE, CPRI, etc.

Figure 41:
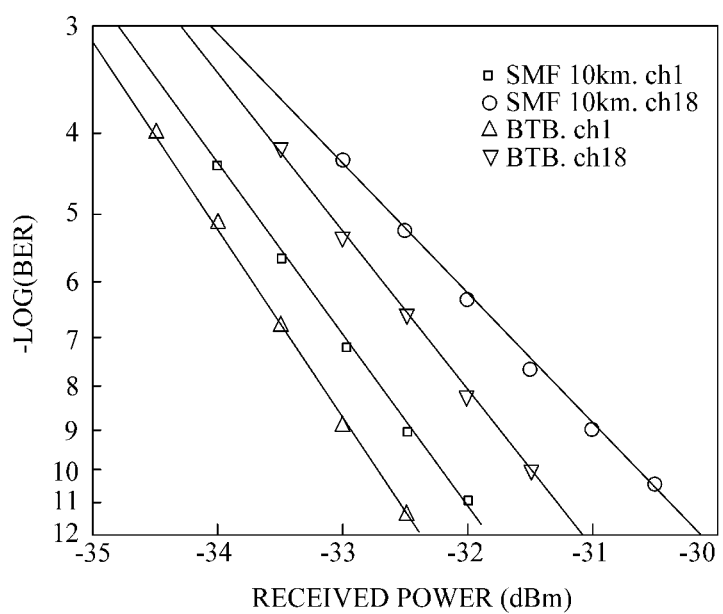
FIG. 41 shows transmission results in a 2.5 Gb/s seed light injection-type WDM-PON.

FIG. 41 shows transmission results in a 2.5 Gb/s seed light injection-type WDM-PON. In FIG. 41, single mode fiber (SMF) 10 km represents a bit error rate (BER) according to the reception sensitivity of an optical receiver measured after transmission at a distance of 10 km, back-to-back (BtB) represents a BER curve according to the reception sensitivity of the optical receiver before transmission at a distance of 10 km. Channel 1 and channel 18 means that optical signals have different wavelengths, and the error floor is not caused after the transmission at a distance of 10 km.

Therefore, considering that the maximum transmission distance specified in the CRPI standard is 10 km, these experimental results shows that the 2.5 Gb/s seed light injection-type WDM-PON is suitable for CPRI standard transmission. In addition to the 4G wireless backup network, the 2.5 Gb/s seed light injection-type WDM-PON may be used for various applications. In particular, the 2.5 Gb/s seed light injection-type WDM-PON may apply to a next-generation optical access network requiring an ultra high-speed broadband service.

In general, the optical access network has a transmission distance of 20 km to 40 km, which is longer than the transmission distance required for the CPRI standard. In the case of the 2.5 Gb/s seed light injection-type WDM-PON satisfying these requirements, the forward error correction (FEC) technology may be used. The FEC technology is to improve the reception sensitivity of receivers using a code including an error correction function as well as an error detection function by adding a large number of excess bits to data bits to be transmitted. Generally, application of the FEC technology improves the reception sensitivity of the receivers by 6 to 7 dB in the case of the 2.5 Gb/s passive optical network. As a result, when the FEC in which the loss of an optical fiber is 0.275 dB/km is used, a transmission distance of the 2.5 Gb/s seed light injection-type WDM-PON may be increased by approximately 26 km or more. For example, a Reed-Solomon (255, 239) may be used as the FEC code. In this case, the difference in degree of improvement of the reception sensitivity of the receivers may be caused according to the FEC code used. As a result, setting of the FEC code is determined according to the desired standardization of the network.

Meanwhile, in the pattern of the above-described optical eye diagram, the similar pattern is observed in the seed light injection-type WDM-PON regardless of the transmission rate of the TEE Tx. This is because the seed light input into the TEE Tx has a constant RIN value. In this case, the proportion of noise components of level "1" increases as the transmission rate increases. This is because the noise suppression efficiency of RSOA or FP-LD used as the TEE Tx is low at high frequencies. However, a crossing value of an optical eye is maintained at 0.45 to 0.35 even when the modulation rate increases. Therefore, the optical eye mask of the TEE Tx in the 2.5 Gb/s seed light injection-type WDM-PON preferably has a pattern similar to the optical eye mask of the 1.25 Gb/s seed light injection-type WDM-PON. Also, a set value of the threshold varying apparatus used in the HEE Rx is preferably adjusted to 0.45 to 0.35 in consideration of the optical eye mask of the TEE signal.

Although the present invention has been described with reference to the preferred exemplary embodiments, it should be understood that the present invention is not intended to limit the above-described exemplary embodiments, and various modifications and changes may be made without departing from the scope of the present invention. Therefore, the modifications and changes will be included in the annexed claims as long as the annexed claims fall within the scope of the present invention.

INDUSTRIAL APPLICABILITY

The present invention may be applied to the passive optical network and applications related to the passive optical network.

The invention claimed is:

1. A wavelength division multiplexing passive optical network (WDM-PON) system including a service provider unit, a remote node, and a plurality of subscriber units,
   wherein the service provider unit includes a plurality of first optical transceivers, a first optical multiplexer/demultiplexer (OD/OM) connected to the plurality of first optical transceivers to multiplex/demultiplex light transmitted/received to/from the plurality of first optical transceivers, and a seed light source configured to provide seed light,
   each of the plurality of subscriber units includes a second optical transceiver,
   the remote node connects the service provider unit and the plurality of subscriber units to each other through a second OD/OM and a dense wavelength division multiplexing (DWDM) link including a single-mode transmitting optical fiber, and
   a light intensity of an output signal from the second optical transceiver is determined by compensating for a loss value caused when the output signal passes through the second OD/OM of the remote node,
   wherein the loss value is an insertion loss caused by an insertion of the DWDM link with a value greater than or equal to 3 dB,
   wherein the insertion loss is a loss of an amplified spontaneous emission (ASE) within the output signal caused by insertion of the DWDM link that allows the light intensity of the output signal without the ASE to be determined, and
   wherein the DWDM link removes the ASE when the light intensity of the output signal is measured.

2. The WDM-PON system according to claim 1, wherein the light intensity of the output signal is determined at the location in light intensity between the service provider unit and the remote node.

3. The WDM-PON system according to claim 1, wherein the compensated loss value is a minimum value of insertion loss of the DWDM link.

4. The WDM-PON system according to claim 1, wherein a wavelength band of the optical signal propagating from the service provider unit to the subscriber units is different from a wavelength band of the optical signal propagating from the subscriber units to the service provider unit.

5. The WDM-PON system according to claim 4, wherein the second OD/OM is a cyclic OD/OM having free spectral range (FSR) characteristics.

6. The WDM-PON system according to claim 1, wherein the single-mode transmitting optical fiber comprises a first single-mode bidirectional fiber configured to connect the service provider unit and the second OD/OM.

7. The WDM-PON system according to claim 1, wherein the single-mode transmitting optical fiber comprises a plurality of second single-mode bidirectional fibers configured to connect the second OD/OM and each of the plurality of subscriber units.

8. The WDM-PON system according to claim 1, wherein a broadband light source (BLS) is used as the seed light source.

9. The WDM-PON system according to claim 1, wherein a coherent light source (a multi-wavelength laser seed source) configured to produce a discrete line in every channel is used as the seed light source.

10. The WDM-PON system according to claim 1, wherein an optical transmitter of the second optical transceiver transmits an optical signal that satisfies an optical eye mask in which a crossing level between a level "1" signal and a level "0" signal is set at a level which is lower than 50% of an intensity of the level "1" signal.

11. The WDM-PON system according to claim 10, wherein the crossing level has an intensity corresponding to 45% of the intensity of the level "1" signal.

12. The WDM-PON system according to claim 1, wherein an optical receiver of the first optical transceiver includes a threshold varying unit configured to vary a decision threshold value to 0.45 to 0.35 on the assumption that an intensity of level "1" of a modulated optical signal is set to 1.

13. The WDM-PON system according to claim 1, wherein a reference transmission rate is 2.45776 Gb/s or 2.5 Gb/s.

14. The WDM-PON system according to claim 1, wherein information transmitted through the WDM-PON system includes a forward error correction (FEC) code.

15. A WDM-PON system comprising a service provider unit, a
remote node,
and a plurality of subscriber units,
wherein the service provider unit includes a plurality of first optical transceivers, a first OD/OM connected with the plurality of first optical transceivers to multiplex/demultiplex light transmitted/received to/from the plurality of first optical transceivers, and a seed light source configured to provide seed light,
wherein the seed light is wavelength-divided and injected into tail end equipment (TEE),
each of the plurality of subscriber units includes a second optical transceiver,
the remote node connects the service provider unit and the plurality of subscriber units to each other through a second OD/OM and a DWDM link including a single-mode transmitting optical fiber, and
an optical transmitter of the second optical transceiver transmits an optical signal that satisfies an optical eye mask in which a crossing level between a level "1" signal and a level "0" signal is set at a level which is lower than 50% of an intensity of the level "1" signal,
wherein a wavelength of the seed light injected into the tail end equipment by the DWDM link is equal to a wavelength of the seed light outputted from the tail end equipment.

16. The WDM-PON system according to claim 15, wherein a BLS is used as the seed light source.

17. The WDM-PON system according to claim 15, wherein a coherent light source (a multi-wavelength laser seed source) configured to produce a discrete line in every channel is used as the seed light source.

18. The WDM-PON system according to claim 15, wherein the crossing level has an intensity corresponding to 45% of the intensity of the level "1" signal.

19. A method of measuring light intensity of an output signal for
a WDM-PON system including a service provider unit, a remote node and a plurality of subscriber units,
compensating for a loss value caused when an output signal of an optical transceiver provided in each the plurality of subscriber units passes through an OD/OM provided in the remote node and measuring light intensity of the output signal of the optical transceiver,
wherein the loss value occurs according to an insertion of a dense wavelength division multiplexing (DWDM) link,
wherein the loss value is a loss of an amplified spontaneous emission (ASE) within the output signal caused by insertion of the DWDM link that allows the light intensity of the output signal without the ASE to be determined, and
wherein the DWDM link removes the ASE when the light intensity of the output signal is measured.

20. The method according to claim 19, wherein the light intensity of the output signal is measured between the service provider unit and the remote node, and the compensated loss value is a minimum value of insertion loss of the remote node.

21. The method according to claim 19, wherein the optical signal satisfies an optical eye mask in which a crossing level between a level "1" signal and a level "0" signal is set at a level which is lower than 50% of an intensity of the level "1" signal.

22. The method according to claim 21, wherein the crossing level has an intensity corresponding to 45% of the intensity of the level "1" signal.

\* \* \* \* \*